US011042832B2

(12) United States Patent
Miller et al.

(10) Patent No.: US 11,042,832 B2
(45) Date of Patent: Jun. 22, 2021

(54) SYSTEM AND METHOD FOR GENERATING AND IMPLEMENTING A HOUSEHOLD CUSTOMER DATABASE

(71) Applicant: United States Postal Service, Washington, DC (US)

(72) Inventors: Naomi Miller, Washington, DC (US); Robert E. Dixon, Jr., Washington, DC (US); Nii-Kwashie Aryeetey, Washington, DC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 279 days.

(21) Appl. No.: 15/839,721

(22) Filed: Dec. 12, 2017

(65) Prior Publication Data

US 2018/0114188 A1 Apr. 26, 2018

Related U.S. Application Data

(63) Continuation of application No. 15/281,615, filed on Sep. 30, 2016.
(Continued)

(51) Int. Cl.
*G06F 30/00* (2020.01)
*G06Q 10/08* (2012.01)
(Continued)

(52) U.S. Cl.
CPC ..... *G06Q 10/08355* (2013.01); *G06F 21/602* (2013.01); *G06Q 10/0838* (2013.01); *H04L 9/14* (2013.01); *G06Q 2220/00* (2013.01)

(58) Field of Classification Search
None
See application file for complete search history.

(56) References Cited

U.S. PATENT DOCUMENTS 5,422,821 A 6/1995 Allen et al.
5,893,464 A 4/1999 Kiani et al.
(Continued)

FOREIGN PATENT DOCUMENTS

JP 01159088 A * 11/1989 ............... B07C 3/08
JP 2008117027 A * 5/2008 ............. G06F 13/00
(Continued)

OTHER PUBLICATIONS

• FORTINET. FortiMail Identity Based Encryption A Business and Compliance Enabler. (Oct. 15, 2011). Retrieved online Oct. 22, 2020. https://www.fortinet.com/content/dam/fortinet/assets/white-papers/fortimail-identity-based-encryption.pdf (Year: 2011).*
(Continued)

*Primary Examiner* — James A Reagan
(74) *Attorney, Agent, or Firm* — Knobbe, Martens, Olson & Bear LLP

(57) ABSTRACT

Systems and methods for generating and implementing a household customer database are disclosed. In one aspect, a method for processing items comprises receiving a first item to be delivered and identifying data corresponding to one or more of a source information and destination information of the first item. The method further comprises identifying secondary information of the first item, storing the source, destination, and secondary information in a database, creating associations between the source, destination, and secondary information, receiving a request to analyze information stored and associated in the database, determining whether the database comprises information necessary to perform the requested analysis, identifying if additional information is needed to perform the requested analysis, updating the secondary information associations to include the additional information if needed to perform the requested analysis, and analyzing the information stored and
(Continued)

associated in the database based on the received analysis request or query.

8 Claims, 15 Drawing Sheets

Related U.S. Application Data

(60) Provisional application No. 62/236,582, filed on Oct. 2, 2015, provisional application No. 62/311,314, filed on Mar. 21, 2016.

(51) Int. Cl.
*G06F 21/60* (2013.01)
*H04L 9/14* (2006.01)

(56) References Cited

U.S. PATENT DOCUMENTS

| | | | |
|---|---|---|---|
| 2003/0182017 A1* | 9/2003 | O'Donohue | B07C 3/00 |
| | | | 700/224 |
| 2004/0128254 A1* | 7/2004 | Pintsov | G07B 17/00435 |
| | | | 705/62 |
| 2004/0128524 A1* | 7/2004 | Ezaki | G06F 21/6245 |
| | | | 713/189 |
| 2005/0259658 A1* | 11/2005 | Logan | H04L 67/306 |
| | | | 370/392 |
| 2006/0136237 A1 | 6/2006 | Spiegel et al. | |
| 2007/0187183 A1* | 8/2007 | Saigh | E04H 14/00 |
| | | | 186/53 |
| 2014/0081951 A1 | 3/2014 | Greenspan et al. | |
| 2014/0330738 A1 | 11/2014 | Falcone et al. | |
| 2015/0227890 A1* | 8/2015 | Bednarek | G06Q 30/0635 |
| | | | 705/26.81 |
| 2017/0154304 A1* | 6/2017 | Aryeetey | H04L 9/14 |

FOREIGN PATENT DOCUMENTS

| | | | | |
|---|---|---|---|---|
| JP | 2014203103 A | * | 10/2014 | G06Q 50/28 |
| KR | 20010076609 A | * | 8/2001 | B07C 3/00 |
| RU | 2597572 C1 | * | 9/2016 | G06K 9/00463 |
| WO | WO 2006/065945 A2 | | 6/2006 | |
| WO | WO-2006065945 A2 | * | 6/2006 | G06Q 10/08 |
| WO | WO 2015/089570 | | 6/2015 | |

OTHER PUBLICATIONS

• Anonymous. Mail sorter—Wikipedia. (May 11, 2015), XP055708743, Retrieved from IDS. https://en.wikipedia.org/w/index.php?title=Mail sorter&oldid=661866552 (Year: 2015).*
• Anonymous. Multiline optical-character reader—Wikipedia. (Sep. 14, 2014). Retrieved from IDS. URL:https://en.Wikipedia.org/w/index.php?title=Multiline_opticalcharacter_reader&oldid=625579046 (Year: 2014).*
International Search Report and Written Opinion dated Dec. 29, 2016 in International Application No. PCT/US16/54529.
International Preliminary Report on Patentability dated Oct. 6, 2017 in International Application No. PCT/US16/54529.
International Search Report and Written Opinion dated Jun. 14, 2019 in International Application No. PCT/US2019/025434.
Anonymous: "Mail sorter—Wikipedia", May 11, 2015 (May 11, 2015), XP055708743, Retrieved from the Internet: URL:https://en.wikipedia.org/w/index.php?title=Mail_sorter&oldid=661866552[retrieved on Jun. 25, 2020].
Anonymous: "Multiline optical-character reader—Wikipedia", Sep. 14, 2014 (Sep. 14, 2014), XP055708744, Retrieved from the Internet: URL:https://en.wikipedia.org/w/index.php?title=Multiline_opticalcharacterreader&oldid=625579046 [retrieved on Jun. 25, 2020].

* cited by examiner

| | Customer Name/ID | Dates | Origin | Destination | Cust Reg | Service Type | Item Type | Credit Card | Add'l Users |
|---|---|---|---|---|---|---|---|---|---|
| Address Change | ✓ | ✓ | ✓ | ✓ | ✓ | ✓ | | ✓ | |
| Schedule of Item Pick-Up | ✓ | ✓ | ✓ | ✓ | | | ✓ | ✓ | |
| Temporary Forwarding | ✓ | ✓ | ✓ | ✓ | ✓ | | | ✓ | |
| PO Box Rentals | ✓ | ✓ | | | ✓ | ✓ | | ✓ | ✓ |
| Online Postage Purchase | ✓ | ✓ | | | | ✓ | | ✓ | |
| Temporary Mail Hold | ✓ | | ✓ | | | | | | |
| Order Mailing Supplies | ✓ | | | ✓ | ✓ | | ✓ | | |
| Buy Stamps | ✓ | | | ✓ | ✓ | ✓ | ✓ | ✓ | |
| Informative Barcodes | ✓ | | | | | | ✓ | | |

FIG. 2

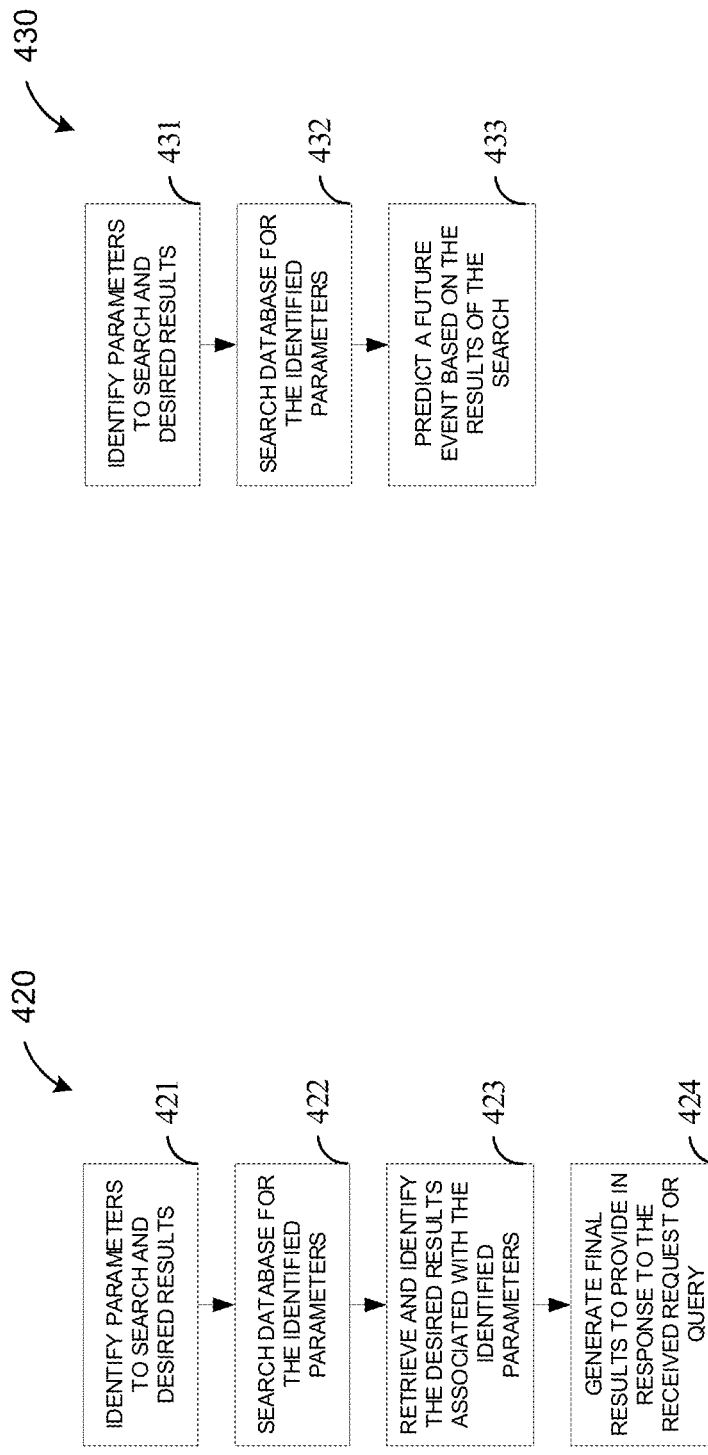

SYSTEM AND METHOD FOR GENERATING AND IMPLEMENTING A HOUSEHOLD CUSTOMER DATABASE

CROSS REFERENCE TO RELATED APPLICATIONS

This Application is a continuation of U.S. application Ser. No. 15/281,615, filed on Sep. 30, 2016, assigned to the assignee hereof, which claims the benefit of U.S. Provisional Application No. 62/236,582, filed Oct. 2, 2015, and U.S. Provisional Application No. 62/311,314, filed Mar. 21, 2016, both assigned to the assignee hereof. The disclosures of these prior applications are considered part of this application, and are hereby incorporated by reference in their entireties.

BACKGROUND

Field

This disclosure relates to systems and methods of receiving, processing, and coordinating delivery of an item or a plurality of items, wherein the system and methods disclosed are configured to generate and analyze a database comprising information associated with the item or plurality of items sent from and received by a particular address or entity. Particularly, the system and methods disclosed are configured to generate the encrypted delivery point information for the item and process items comprising encrypted delivery point information (such as address information) so that a sending or shipping entity or user is able to have the item delivered to the recipient without the sending or shipping entity having actual knowledge of the delivery point associated with the recipient.

Description of the Related Art

The delivery of items by a distribution service, system, or network involves processing and handling each of the items being delivered. Such processing and handling provides opportunities to analyze the items being delivered for at least physical attributes, source information, and destination information, which may be used to provide personalized services or offers to customers of the distribution service. Systems and methods configured to store and analyze or mine this information to generate aggregate information for a set of customers or addresses to predict events associated with one or more customers or addresses are desired.

Additionally, a sender sending an item generally must know the delivery point to which the item is destined. Without this information being indicated on the item, the distribution system will be unable to deliver the item to a recipient. However, in some situations, the sender may not have access to the recipient's correct delivery point, and thus, may be unable to send an item to the recipient through the distribution system. Thus, systems and methods configured to generate and process the encrypted delivery point information are desired.

SUMMARY

Some aspects described herein include a method of dynamically routing items comprising selecting, by a processor, a plurality items for dynamic routing based on a criteria; generating, by a processor, a run manifest, the run manifest comprising an item identifier and a destination for each of the plurality of items; sending the run manifest to a routing module; generating, by a processor, one or more dynamic routes for delivering the plurality of items according to the destination for each of the plurality of items; and associating the item identifier of one or more of the plurality of items with one of the one or more dynamic routes and storing the association in a memory.

An aspect comprises a method of providing recipient information, the method comprising receiving a request for names and corresponding delivery point information from a user, wherein the request includes at least a quantity of names and delivery points being requested and querying a database to identify the quantity of names and delivery points requested by the user. The method also comprises storing the identified names and delivery points in a temporary file and selecting an encryption key based on one or more of: a global encryption key, a user specific encryption key, or the quantity of names and delivery points requested by the user. The method further comprises generating encrypted delivery point information corresponding to each identified name and delivery point based on the selected encryption key and the stored delivery points in the temporary file and sending the names and corresponding encrypted delivery point information to the user.

Another aspect comprises a method of distributing an item, the method comprising receiving the item for distribution via a distribution system, the item comprising delivery point information and determining whether the delivery point information comprises encrypted delivery point information. The method further comprises flagging the item as encrypted or non-encrypted based on the determination and generating decrypted delivery point information by decrypting the encrypted delivery point information when the item is flagged as encrypted. The method also comprises parsing the decrypted delivery point information to determine sorting and routing instructions and sending sorting and routing instructions to a sorting apparatus. The method also further comprises causing the sorting apparatus to route and sort the item according to the determined sorting and routing instructions.

In one aspect, a method for processing items in a delivery stream to be delivered may be disclosed. The method comprises receiving a first item to be delivered and identifying data corresponding to one or more of a source information and destination information of the first item to be delivered. The method further comprises identifying secondary information of the first item to be delivered, storing the source information, destination information, and secondary information in a database, and creating associations between the source information, destination information, and secondary information in the database. In method also comprises receiving a request to analyze information stored and associated in the database, determining whether the database comprises information necessary to perform the requested analysis, identifying if additional information is needed to perform the requested analysis, updating the associations to include the additional information if needed to perform the requested analysis, and analyzing the information stored and associated in the database based on the received analysis request or query.

Another aspect is a method for processing items to be delivered in a delivery stream. The method comprises receiving an item to be delivered and identifying data indicative of at least one of a unique address and contact information, the data comprising at least one of an e-mail address, a virtual address, a phone number, and a non-physical location identifying individual identifier of a recipient of the item. The method further comprises searching a database of addresses, the database of addresses comprising one or more searchable lists of e-mail addresses, virtual addresses, phone numbers, and non-physical location individual identifiers and one or more corresponding lists of physical addresses. Associating the identified data with a location specific physical address from the database of addresses, and generating an address label for the item, the address label comprising the associated physical address of the recipient of the item. The method also includes applying the address label to the item, sorting and distributing the item in the delivery stream so as to facilitate delivery of the item to the physical address of the address label, and delivering the item to the recipient at the physical address of the address label.

An additional aspect is a system for processing items in a delivery stream to be delivered. The apparatus comprises a memory, comprising a database, configured to create associations between information stored in the database, an interface configured to receive a request to analyze information stored and associated in the database, and a processor. The processor is configured to identify data corresponding to one or more of source information and destination information of a first item to be delivered, identify secondary information of the first item to be delivered, and store the source information, destination information, and secondary information in the database. The processor is further configured to create associations between the source information, destination information, and secondary information in the database, determine whether the database comprises information necessary to perform he requested analysis, identify if additional information is needed to perform the requested analysis, and analyze the information stored and associated in the database based on the received analysis request.

An additional aspect is an apparatus for providing delivery point information, the apparatus comprising means for receiving a request for delivery point information from a user, wherein the request includes a recipient name and at least one unique digital identifier and means for querying a database for the recipient name and the at least one unique digital identifier to determine whether the database includes the delivery point information for the recipient. The apparatus also comprises means for retrieving the delivery point information associated with the recipient name and the at least one unique digital identifier and means for generating encrypted delivery point information based on the retrieved delivery point information and at least one encryption algorithm. The apparatus further comprises means for sending the encrypted delivery point information to the user.

Another aspect is an apparatus for providing recipient information, the apparatus comprising means for receiving a request for names and corresponding delivery point information from a user, wherein the request includes at least a quantity of names and delivery points being requested and means for querying a database to identify the quantity of names and delivery points requested by the user. The apparatus further comprises means for storing the identified names and delivery points in a temporary file and means for selecting an encryption key based on one or more of: a global encryption key, a user specific encryption key, or the quantity of names and delivery points requested by the user. The apparatus also comprises means for generating encrypted delivery point information corresponding to each identified name and delivery point based on the selected encryption key and the stored delivery points in the temporary file and means for sending the names and corresponding encrypted delivery point information to the user.

An additional aspect is an apparatus for processing items in a delivery stream to be delivered. The apparatus comprises means for receiving a first item to be delivered and means for identifying data corresponding to one or more of source information and destination information of the first item to be delivered. The apparatus further comprises means for identifying secondary information of the first item to be delivered and means for storing the source information, destination information, and secondary information in a database. The apparatus also comprises means for creating associations between the source information, destination information, and secondary information in the database and means for receiving a request to analyze information stored and associated in the database. The apparatus also further comprises means for determining whether the database comprises information necessary to perform the requested analysis and means for identifying if additional information is needed to perform the requested analysis. The apparatus further also comprises means for updating the associations to include the additional information if needed to perform the requested analysis and means for analyzing the information stored and associated in the database based on the received analysis request or query.

One aspect of the invention described herein includes a method of providing delivery point information. The method comprises receiving a request for delivery point information from a user, wherein the request includes a recipient name and at least one unique digital identifier and querying a database for the recipient name and the at least one unique digital identifier to determine whether the database includes the delivery point information for the recipient. The method also comprises retrieving the delivery point information associated with the recipient name and the at least one unique digital identifier and generating encrypted delivery point information based on the retrieved delivery point information and at least one encryption algorithm. The method also comprises sending the encrypted delivery point information to the user.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 2 is a table indicating examples of information to be stored in the database of the memory that is acquired through services offered.

FIG. 4B depicts a flow chart of a first example of the sub-method 420 for mining and analyzing the household database in a general manner.

FIG. 4C is a flow chart of another example of the sub-method 430 for mining and analyzing the household database to predict future actions and events.

DETAILED DESCRIPTION

Figure 1A:
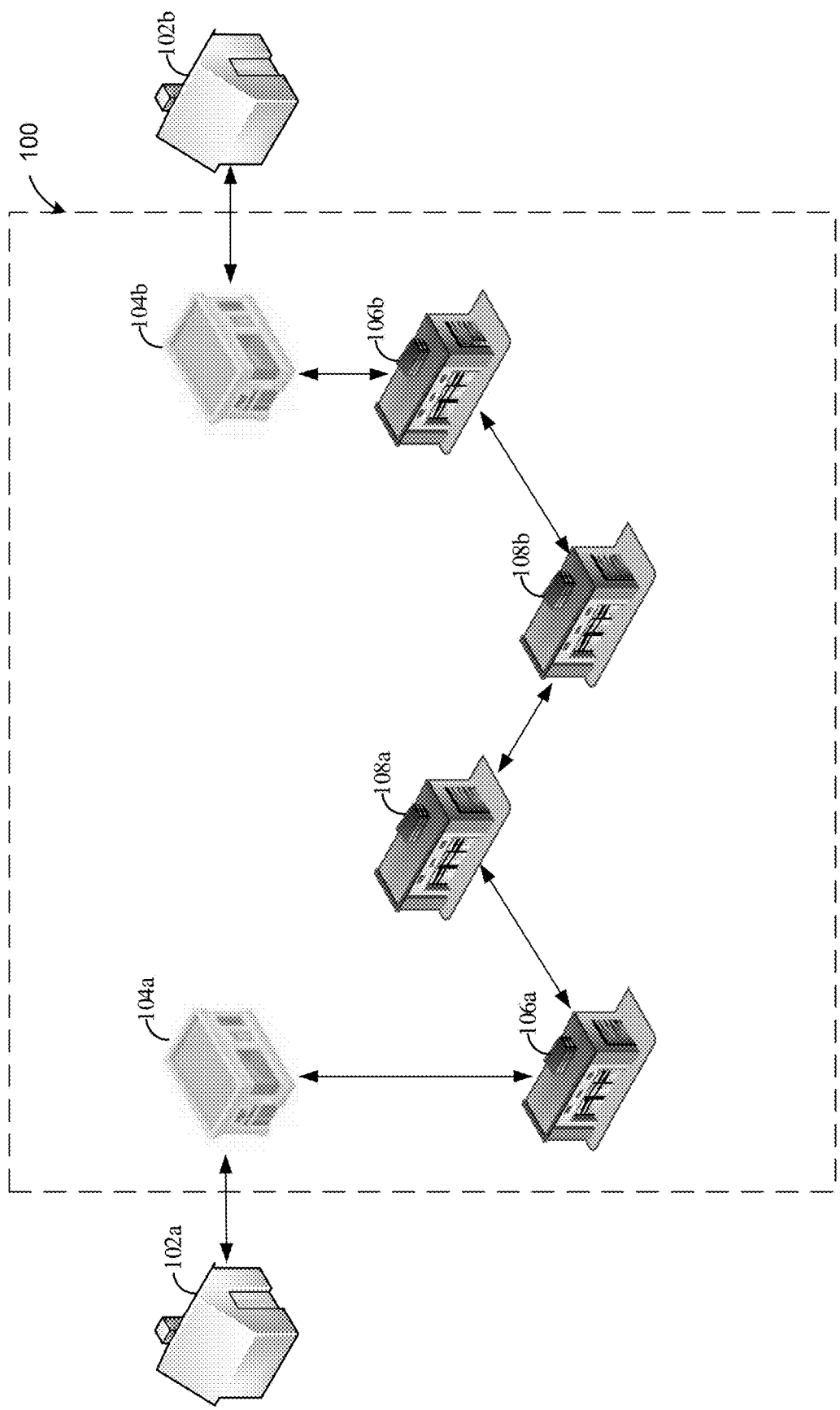
FIG. 1A depicts a diagram of one embodiment of a distribution system or network used to distribute items between shippers and recipients.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for receiving, processing, and coordinating delivery of an item or a plurality of items. The systems and methods disclosed herein are configured to generate and analyze a database comprising information regarding the item or plurality of items sent from and received by a particular specific address or entity. This may include identifying physical attributes of the item or plurality of items being delivered and storing these attributes in a household database. In the household database, these physical attributes may be associated with one or more addresses or names from which the item or plurality of items were sent and/or to which the item or plurality of items were or are being delivered.

The present disclosure further relates to systems and methods for generating and distributing encrypted and/or anonymized recipient information to shippers and receiving, processing, and coordinating delivery of an item or a plurality of items to which encrypted recipient (address) information or delivery point information (e.g., a mailing address, GPS coordinates, grid coordinate, or any other location identifier) has been applied. The systems and methods disclosed herein are configured to generate the encrypted delivery point information for distribution to the shippers based on a request received from the shippers. The systems and methods disclosed are further configured to distribute the encrypted delivery point information to the shippers. The systems and methods disclosed are also configured to receive and distribute the item or items to which the encrypted delivery point information is applied to the proper recipient destinations as determined by the recipient information.

Additionally, the household database may be used to store information regarding how many items, such as packages and similar articles, were sent or received by an address or entity and associated dates for said sending and receiving. For example, an address may receive four items in a span of three days, two of the items being packages and two of the items being letter size. The system or method may identify the letter size items as being cards based on identifying a card manufacturer logo on the envelope or based on the size of the letter size item. The packages may be identified by the system or method as being a gift based on wrapping paper or other physical markings on the packages. This information may be entered into the household database and compared with information from a previous time period, such as a previous month or a previous holiday period. If a pattern of receiving increased amounts of items around a small range of dates is discovered, then the system or method may identify the range of dates as being a life event, such as a birthday or an anniversary. This identified life event may be used to identify potential services associated with the life event or the date. In order to accomplish efficient, practical, and usable analysis of entries in the database, the systems or methods may require real-time attribute identification and acquisition for each item in the distribution network, as well as immediate and real-time entry of acquired information into the database and analysis of the database entries associated with either or both of the sending and delivery addresses or entities.

In some embodiments, a shipper may desire to send one or more items to a number of "unknown" recipients, where the unknown recipients may comprise potential customers, etc. with whom the shipper has had no previous communication. Accordingly, the shipper may not have names or delivery points of these potential customers, and may request that a distribution entity (e.g., an entity that operates a distribution system as described herein) provide the shipper with a list of names and corresponding delivery points to which the shipper may subsequently send one or more items.

For example, the shipper may be a publisher of an outdoors themed magazine. Accordingly, the shipper may request 10000 names and delivery points to which they intend to send subscription offers, etc. In some embodiments, the shipper may request random names and delivery points or may specify in the request the names and delivery points of recipients the distribution system knows are interested in associated subjects, e.g., outdoors activities. Accordingly, the distribution system may identify and provide names and encrypted (e.g., anonymized) delivery point information for 10000 recipients, either at random or from a database of recipients and associated delivery point information. In some embodiments, the names may be provided without any encryption or anonymization, but the delivery point information may be encrypted and anonymized so that the shipper cannot easily identify physical delivery point information associated with each name, thus maintaining anonymity for the named recipients while allowing the shipper to communicate with them. In some embodiments, the distribution network supplies names, or does not supply names associated with the delivery point information.

The gathering, analysis, and implementation of the information and a recipient's participation in the encrypted (e.g., anonymized) program described herein in relation to information stored in a database may utilize customer and entity "opt-ins." For example, the systems described herein may obtain permission from customers and entities for collection and use of information associated with delivery of items for purposes outside of general "shipping services." For example, gathering and analyzing information from items in order to provide tailored services and offerings may be viewed as outside of "postal services," and thus may utilize customer permissions to allow such actions based on item information. Some examples of the information collected may include item or package information, associations between sender and recipient, associations with important dates or events, etc. Examples of the item or package information may include characteristics of the items or packages, such as size, weight, shape, etc. Additionally, the interest of the recipient may be gathered and analyzed by the distribution system. Some examples of information collected to determine interests of the recipient may include item or package information, such as images of items received, characteristics of the items or packages received, such as size, weight, shape, etc., and sender or recipient information of items sent or received by the recipient.

In some embodiments, system described herein configured to perform the described gathering, analysis, and implementation described herein may request and acquire a general information disclosure opt-in system by which a resident, customer, and/or entity served by the system may generally opt-in/opt-out of any disclosure or approval to collect any information as discussed herein. In some embodiments, the system may request each resident or entity at a particular address or in the database to opt-in to (or out of) each type of information or each step of information use or element of the household database. Examples of opting-in may include residents or entities agreeing to allow the gathering, analysis, and implementation of item information or association and agreeing to allow the association of their e-mail addresses with their physical delivery point. In some embodiments, individual disclosure opt-in requests may be utilized for each type of information discussed above, which may include payment information, item/package information, address information, address/entity association information, etc.

In some embodiments, individual disclosure opt-in requests may be utilized for each association discussed above. In some embodiments, the resident or entity may be provided with an option to include or exclude certain associations and/or information, such as include the disclosure of an association with a particular e-mail address with the physical delivery point while excluding the association of the resident's or entity's Facebook® or Twitter®, or other social media handle, user name, and the like. Accordingly, the opt-in or permission system may offer a variety of customizable options for the customer or entity to selectively utilize. Once the associations between resident names, delivery points, physical addresses, and unique digital identifiers are created and stored in the household database, and when the residents have provided their consent via the opt-in system, the household database may be configured to participate in an encrypted delivery point information system, as described herein. The associations contained in the household database may thus, as described herein, allow a shipper to send an item to a known or unknown recipient without actual knowledge of a delivery point associated with the recipient, such as the recipient's physical delivery point.

Furthermore, the distribution system described herein as providing the delivery point and association information may utilize a household database that comprises the association information between residents or entities at a particular delivery point and any available digital or electronic identifiers (e.g., e-mail address, IP address, Twitter® identifier, Facebook® identifier, social media handle, virtual address, etc.). The household database may be generated and maintained by various systems and methods. These systems and methods may generate and analyze a database comprising information regarding an item or plurality of items sent from and received by a particular delivery point or entity. This may include identifying physical attributes of the item or plurality of items being delivered and storing these attributes in the household database. In the household database, these physical attributes may be associated with one or more delivery points or names from which the item or plurality of items were sent and/or to which the item or plurality of items were or are being delivered.

Alternatively, or additionally, the gathering, analysis, and implementation of the information described below in relation to information stored in a database may be performed at a macro level such that individual information is not identifiable and is sufficiently masked, for example, analyzed based on ZIP code, a street, or an apartment building/complex, or by anonymizing addresses and other information seen by a party that requests an analysis.

Once the data is gathered, and when customers and entities have provided their permission, the gathered data may be reviewed and analyzed. The data may be reviewed to provide additional insights into the customers and entities having items and/or packages delivered and to help explain how and why customers engage with certain services, and what/why new services may be appealing for various customers and entities. For example, details of items and packages sent from or received at a specific address may be analyzed to identify particular habits or potential events (for example, life events) that may have recently happened or may happen in the near future. Similarly, details of items and packages sent by or received by a specific customer may be analyzed to determine potential changes in the customer and/or the customer's life. For example, correlations may be drawn between multiple customers requesting a change of address to a same physical address and receipt of a larger number of packages and other items as potential for being a newly married or newly relocated group of people.

In some embodiments, once the data is gathered and reviewed and analyzed, the results of the review and analysis may be implemented to identify and/or create new services, products, and offerings to further assist customers and entities. In some embodiments, third parties not directly involved in the distribution system may provide these new services, products, and offerings (or other implementations). In some embodiments, the above gathering, reviewing, and implementing processes may be handled with the strictest of privacy constraints so as to protect the customers and entities.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network. The term "distribution system" may correspond to a collection of components that form a distribution network, as operated by a distribution entity. Accordingly, the terms "distribution system," "distribution network," and "distribution entity" may be used interchangeably to refer to the same or similar components or entities.

Additionally, as used herein, the term "resident" may refer to any individual or entity that resides, works, visits, or is associated with a physical delivery point. For example, as used herein, a person at his or her office is a resident, as is a student or teacher at a school. As used herein, a resident can be an entity capable of sending items from a delivery point and receiving items at a delivery point. Additionally, the term "residence" may refer to any building having an assigned physical delivery point, such as a house, an office building, an apartment, a factory, a school, etc. As used herein, a residence can be any location capable of being a destination for items within the distribution network or it can be a return delivery point for items in the distribution network.

For example, an item delivery service or distribution network such as the United States Postal Service (USPS), the United Parcel Service (UPS), Federal Express (FedEx), or other shipping or item delivery service may deliver items of items, such as letters, flats, etc., according to static routes, and may deliver parcels, packages, and bulky items according to dynamic routes. UPS will be used in the present disclosure to describe some exemplary embodiments, but the present disclosure is not limited thereto. When referencing generically to any of the services listed above or any item delivery service in addition to those listed above, the phrase "item delivery service" will be used to indicate such generalities.

The USPS delivers items, such as items and packages, to every physical address in the United States on a daily basis, Monday through Saturday. The USPS is tasked with providing secure, reliable, and affordable delivery of items to every address in the United States, U.S. territories, and U.S. military installations worldwide. For example, the USPS delivers more than 528 million items to over 152 million destinations or addresses every day. In delivering these items to each of these addresses, in the United States and worldwide, the USPS is in a unique position of being able to gather information regarding these items while they are in transit within the USPS distribution network. For example, the USPS can gather information regarding items received at a residence or by a resident through its distribution network. The USPS may also identify that a residence or more than one residence within a geographic area requests or receives specific periodicals, advertisements, deliveries, or other items. Additionally, since most items likely include a resident to which they are destined, the USPS may correlate the residence receiving a specific item with the resident that is identified as being the recipient of the item, when possible. Thus, the USPS may generate associations between residents and the residences to which the USPS delivers said items. Additionally, the USPS wishes to protect the personal information of individuals and other entities to which the USPS delivers items while providing enhanced services. Thus, the USPS may not wish to simply provide personally identifiable information (PII) to shippers or other entities. To protect the PII of USPS customers, or of any distribution system, delivery point information can be anonymized and/or encrypted, as described below.

The distribution network of the USPS may comprise multiple levels. For example, the distribution network may comprise regional distribution facilities, hubs, and unit delivery facilities, or any other desired level. For example, the nationwide distribution network may comprise one or more regional distribution facilities having a defined coverage area, such as a geographic area, for example a state or a metropolitan area, designated to receive items from intake facilities within the defined coverage area, or from other regional distribution facilities. The intake facility may function to be the location or facility where individual items are, for the first time in the distribution network, identified and entered into the tracking of the distribution network. The regional distribution facility can sort items for delivery to another regional distribution facility, or to a hub level facility within the regional distribution facility's coverage area. A regional distribution facility can have one or more hub level facilities within its defined coverage area. A hub level facility can be affiliated with a few or many unit delivery facilities, and can sort and deliver items to the unit delivery facilities with which it is associated. In some embodiments, the unit delivery facility may also serve as the intake facility. In the case of the USPS, the unit delivery facility may be associated with a ZIP code. The unit delivery facility can receive items from local senders, and from hub level facilities or regional distribution facilities. The unit delivery facility can also sort and stage the items intended for delivery to destinations within the unit delivery facility's coverage area.

As described above, the distribution network employed may comprise numerous pieces of equipment located in various facilities that may automatically route items according to information indicated on the items, physical characteristics of the items, and/or postage characteristics. For example, a letter shipped from San Diego, Calif., to Washington, D.C., with First Class postage may be routed differently than a large package shipped between the two locations. Similarly, a second letter shipped with Next Day postage may be routed differently than the letter shipped with First Class postage. The variety of potential routes for different types of items or different postage services indicates the benefit of distributing a system throughout the distribution network, for example in multiple intake and unit delivery facilities, to maximize the amount of information gathered by the system to associate with residences and addresses.

FIG. 1A depicts a diagram of one embodiment of a distribution system 100 used to distribute items between shippers 102a and recipients 102b. The distribution system 100 may be employed by an item delivery service to distribute items received and to be delivered across a geographic area. The distribution system 100 shows various distribution points or facilities. In some embodiments, the distribution system 100 may include more or fewer distribution points or facilities than shown in distribution system 100. For example, the distribution system 100 includes delivery units 104a and 104b (e.g., post offices or drop-off locations). The distribution system 100 may also include semi-regional facilities 106a and 106b (e.g., sectional center facilities) and regional facilities 108a and 108b (e.g., network distribution centers or distribution hubs).

The delivery units 104a and 104b may correspond to a facility that receives, sorts, and delivers items destined to recipients within a given geographic area. In the case of the USPS, the delivery units 104a and 104b may be associated with a region covered by a ZIP code™ (a trademark of the USPS). In this role, the delivery units 104a and 104b may receive items from the semi-regional facility 106a that serves it. These items received from the semi-regional facilities 106a and 106b may be delivered by the delivery units 104a and 104b (e.g., via a mail carrier route, etc.) to the appropriate destination within its covered geographic area. Accordingly, the delivery units 104a and 104b may also sort and stage the items intended for delivery to destinations/recipients within the delivery unit's coverage area.

The delivery units 104a and 104b may also serve to receive and enter items into the distribution system 100. When serving as an intake facility, items that are received and entered into the distribution system 100 may be sent to the semi-regional facilities 106a and 106b. In some embodiments, the delivery units 104a and 104b may receive items from local shippers, from semi-regional facilities 106a and 106b, or regional facilities 108a and 108b. While the delivery unit 104a is shown as the intake facility, any of the semi-regional and regional facilities 106a and 106b and 108a and 108b, respectively, or other facilities not shown, may serve as the intake facility.

The semi-regional facilities 106a and 106b may receive and distribute items between multiple delivery units 104a and 104b and the associated regional facilities 108a and 108b. In the case of the USPS, the semi-regional facilities 106a and 106b may each be associated with a geographic region covered by the first three numbers of a ZIP code. The semi-regional facility 106a may serve as a processing and distribution center for the respective multiple delivery units 104a and 104b within its respective geographic areas. In some embodiments, the semi-regional facility 106a may receive items from the regional facility 108a for distribution to its respective delivery unit 104a. In some embodiments, the semi-regional facility 106a may receive items from its delivery unit 104a, for distribution to other delivery units 104b or the regional facility 108a.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution another semi-regional facility 106b that the regional facility 108a serves. In some embodiments, the regional facility 108a may receive items from its semi-regional facilities 106a and 106b for distribution to other regional facilities, e.g., the regional facility 108b.

When the item enters the distribution system 100 at the intake facility (e.g., regardless of delivery unit 104a, semi-regional facility 106a, and regional facility 108a), the item may be tracked through all sortation and distribution steps through which the item may pass. In some embodiments, such tracking may be individual to the item or be aggregate for volumes of items. The tracking may occur until the item is delivered to its destined recipient or until the item leaves a delivery unit 104b for delivery to its destined recipient.

In some embodiments, the distribution system 100, as shown, may be a national distribution network that comprises multiple regional facilities 108a and 108b, multiple semi-regional facilities 106a and 106b, and multiple delivery units 104a and 104b, each having a defined coverage area, such as a geographic area and designated to receive and/or delivery items to/from recipients and senders in the geographic area.

As described herein, the distribution system 100 employed may comprise numerous pieces of equipment located in various facilities and at each level within the distribution system 100 (described and not described) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment may identify delivery point information that is printed on the item and reference stored information associated with the delivery point information to assist in the sorting and routing of the item.

Alternatively, or additionally, these pieces of equipment may identify recipient delivery point information and sort and route the item based on the identified recipient delivery point information. In some embodiments, different items being routed between the same locations may be routed differently based on a type of the item, postage of the item, size of the item, etc. For example, a first letter shipped from San Diego, Calif., to Washington, D.C., with first class postage may be routed differently than a large package shipped between the two locations. Similarly, a second letter shipped with next day postage may be routed differently than the first letter shipped with first class postage. The variety of potential routes for different types of items or different postage services indicates the benefit of distributing a system throughout the distribution network, for example in multiple intake and unit delivery facilities, to maximize the amount of information gathered by the system to associate with residences and delivery points.

Figure 1B:
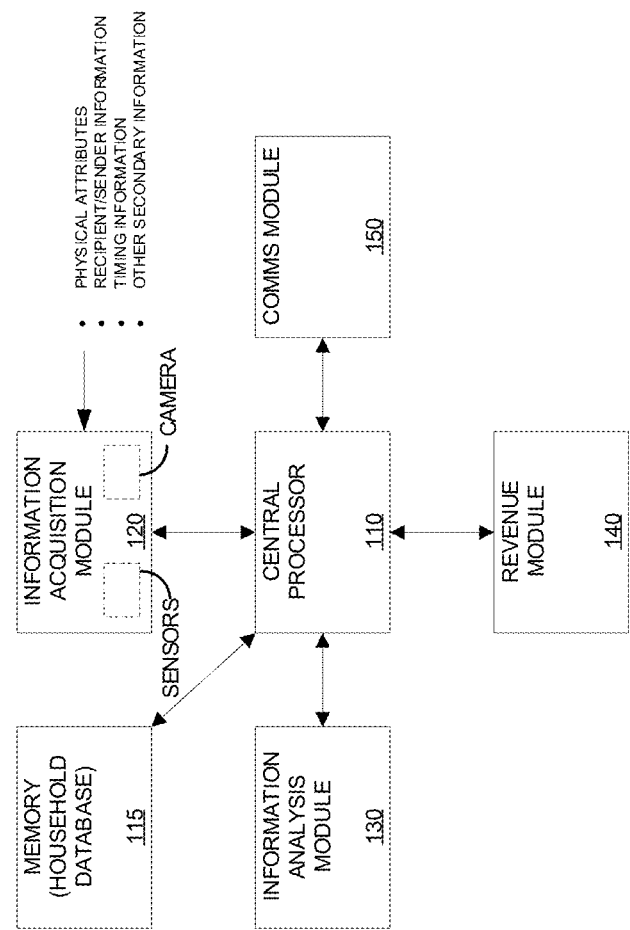
FIG. 1B depicts a block diagram of one embodiment of a system for acquisition and analysis of a household database.

FIG. 1B depicts one embodiment of a system 101 for acquisition and analysis of information in a household database. The system 101 may be integrated within or at any of the points or facilities described in relation to the system 100. In some implementations, the system 101 is integrated across the points or facilities of the system 100 where the system 101 is a distributed or centralized system. The system 101 comprises a central processor 110, a memory 115, an information acquisition module 120, an information analysis module 130, a revenue module 140, and a communication module 150. The system 101 may be implemented at any level of the distribution network described above, such as in a unit delivery facility, a hub level facility, a regional distribution center, or a national distribution network control level. In some embodiments, the system 101 and/or the various components therein may be distributed between one or more levels of the distribution network described above. For example, the system 101 may have one or more components in a unit delivery facility and may have other components in more than one other facility, for example in the regional distribution center.

In some embodiments, the national distribution network control level may comprise one central processor 110 and one memory 115 in communication with each other module of the system 101, where each other module may service a portion of the national distribution network. In some embodiments, multiple systems 101 may be implemented at a local level. For example, one or more of the components of the system 101 may be distributed between one or more of the unit delivery facility, the hub level facility, and the regional distribution facility. The multiple systems 101 may then communicate with each other as necessary. In some embodiments, such a distribution of multiple systems 101 may prove to be more efficient than having a single, centralized system with which each of the components must communicate. In some embodiments, the components associated with information acquisition may be distributed at lower levels of the distribution network described above, while the storage, analysis, and communications components may be distributed at higher levels of the national distribution network. For example, the information acquisition modules 120 may be implemented at intake facilities, thus allowing the information acquisition modules 120 to collect information from items early in or at the end of the distribution process, for example in intake facilities or unit delivery facilities. These information acquisition modules 120 may be in communication with one or more central processors 110, memory 115, revenue modules 140, information analysis modules 130, and communication modules 150, which may be located at different levels than the information acquisition modules 120, for example distributed in the hub level facilities and/or the regional distribution facilities.

In some embodiments, the system 101 may have a single central processor 110 and memory 115 with multiple information acquisition modules 120, information analysis modules 130, revenue modules 140, and communication module 150s, all of which are interconnected. The central processor 110 and memory 115 may be configured to interact and communicate with each of the other modules, wherein each of the other modules may service defined coverage areas, such as a specified geographic region. For example, a state or a city may comprise a collection of information acquisition modules 120, information analysis modules 130, revenue modules 140, and communication module 150s, that each communicate to the central processor 110 and memory 115. For ease of discussion herein, the system 101 will be described with reference to its use in a unit delivery facility. Accordingly, other unit delivery facilities may have their own systems 101, where the individual memory 115 and central processor 110 for each system corresponds to the specified geographic regions. In some embodiments, the multiple systems 101 each comprising central processors 110 may share a single memory 115. In some embodiments, the multiple systems 101 each have individual memory 115 but all share a single central processor 110. In some embodiments, the multiple systems 101 each have individual memory 115 and individual central processors but are still interconnected via one or more communications systems.

The central processor 110 can be embodied on a computer or a server which communicates via wired or wireless link to the memory and modules of the system 101. In some embodiments, the central processor 110 can be remote to the unit delivery facility in which the remaining modules of the system 101 are associated, and may service more than one unit delivery facility. For example, the central processor may be on a computer or server within the regional distribution facility. The central processor 110 may control and/or direct the operation of the components of the system 101. The communications between the various modules of the system 101 described below may occur via the central processor 110 (as shown in FIG. 1B) or may occur directly between the various modules (not shown in FIG. 1B). In some embodiments, all processing for the various modules of the system 101 may be performed by the central processor 110.

The memory 115 is in communication with the central processor 110, the information acquisition module 120, the information analysis module 130, the revenue module 140, and the communication module 150. The memory 115 can store data and information, such as in a household database, a relational database, or in any other information storage format, such as comma delimited, etc. The memory 115 can also store the operating instructions for the modules of the system 101. In some embodiments, the memory 115 may comprise an individual computing system configured to store information having its own processor and communication modules.

The information acquisition module 120 may comprise a computer, a processor, software running on the central processor 110, or the like. In some embodiments, the information acquisition module 120 may be integrated with one or more other modules of the system 101. Additionally, the information acquisition module 120 may comprise one or more sensors, cameras, connections with sensors or connections with cameras or other input devices configured to identify and capture physical attributes of the item. For example, the information acquisition module 120 may receive inputs or signals comprising, for example, a mass or weight of the item, dimensions of the item, shape of the item, or physical markings on the item, such as a logo or description of the contents or a decorative bow or wrapping paper or infrared or other non-visible markings.

The information analysis module 130 may comprise a computer, a processor, software running on the central processor 110, or the like. In some embodiments, the information analysis module 130 may be integrated with one or more of the other modules of the system 101. For example, the information analysis module 130 may be integrated in the memory 115 comprising the household database and may be configured and designed to search and analyze the information stored in the household database. In some embodiments, the information analysis module 130 may also receive information directly from the information acquisition module 120, the communication module 150, or the central processor 110. In some embodiments, the information analyzed by the information analysis module 130 is received from other systems 101 utilized by the distribution network, which are not depicted nor described here in detail. In some embodiments, the information analysis module 130 may be configured to locally store one or more analytical tools (for example, statistical software, etc.) or to store and access analytical tools in the memory 115.

The revenue module 140, which may be used to generate revenue using information from the household database, may comprise a computer, a processor, software running on the central processor 110, or the like. In some embodiments, the revenue module 140 may be integrated with one or more of the other modules of the system 101. For example, the revenue module 140 may be integrated in the central processor 110 and may be configured and designed to search the information and analyses stored in the household database to identify potential implementations to generate revenue. In some embodiments, the revenue module 140 may also receive information directly from the information analysis module 130, the communication module 150, or the central processor 110. In some embodiments, the revenue module 140 may be configured to locally store one or more identified revenue generating implementation of the information or analyses stored in the memory 115 or received from one of the information analysis module 130 or the information acquisition module 120.

The communication module 150 comprises a module that is configured to allow any component of the system 101 to communicate with one or more devices and modules external to the system 101. For example, the communication module 150 may provide wireless or wired communication capabilities with a communication module 150 of another system 101 or with a third party. The communications with the third party may be via the Internet or a similar network type connection. The communication module 150 may be configured to receive communications from third parties, for example, requests and queries for analysis of the household database. The communication module 150 may also be configured to transmit the results of the requests and queries for analysis to third parties. The communication module 150 may also communicate with other systems of the item delivery service, for example the systems that control the services that the item delivery service provides. The communication module 150 may be configured to provide communications for each of the components of the system 101. The communication module 150 may also be configured to allow the modules of the system 101 to access external resources, such as the Internet or a local network, etc.

FIG. 2 is a table 200 indicating examples of information to be stored in the database of the memory 115 that is acquired through services offered. As shown in table 200, the columns 202 indicate different fields of data categories or information that may be acquired regarding entities or addresses. Examples of the data categories or information depicted in columns 202 include "Name," "Dates," "Origin," "Destination," "Service Type," "Item Type," and "Credit Card" information. Other or fewer data fields or information than those shown in table 200 may be identified and stored in the household database, as discussed below.

The rows 204 of the table indicate examples of services provided by the item delivery service (such as UPS) that may acquire the information or data categories of the columns 220 of the table 200. Examples of services provided shown in table 200 include "Address Change" services, "Scheduling of Item Pick-up" services, "Temporary Forwarding or Mail Hold" services, postage and shipping supplies purchase and ordering, and PO Box rentals, among others not shown in table 200. Some embodiments may include more or fewer data categories. The body of the table 200 includes indicators in cells that indicate what data categories in the columns 202 may be available or acquired from each service of the rows 204. For example, via an address change service request, the item delivery service may acquire Customer Name information, dates associated with the address change service request, an origin address (the destination address for the item that may be changed while the address change service request is active), a destination address (the address to which items destined for the origin address may be forwarded), customer registration information, for example, e-mail address, virtual address, phone number, etc., service type (temporary or permanent or delivery service type to be used while the address change service request is active, for example First Class forwarding or Next Day forwarding), and credit card information.

While the table 200 of FIG. 2 depicts ten services in the rows 204, additional or fewer services not depicted in table 200 may be utilized to acquire the nine (or more or fewer) data categories of information depicted in this figure. The data categories as shown in table 200 may be examples of information that is acquired by the communication module 150, the central processor 110, the information acquisition module 120, or the revenue module 140. In some cases, the information in these fields may not be readily available from a physical evaluation of items being shipped and may be obtained by individual entry or an electronic or physical manifest by the shipper of the item, such as credit card information or dates associated with the item. In some embodiments, the additional information relating to specific addresses and entities may be used for mining and analysis. For example, the information analysis module 130 may use the additional information of the chart in FIG. 2 to determine when entities may be moving or taking a vacation, which may be of interest to third parties, such as moving companies, shipping companies, or security companies. Thus, such information may be provided or otherwise distributed.

The system 101 may utilize the modules described above to identify and gather information from items that are distributed using the distribution system described above, such as the information in FIG. 2 described in brief above. The system 101 may use the information gathered to identify trends, habits, general preferences, life events, etc., of the residents and entities that send and receive the items via the item delivery service. The identified trends, habits, preferences, events, etc., may then be used to identify, generate, and implement services, products, and other applications that may generate increased revenue for the item delivery service. For example, the system 101 may identify, based on information gathered by the information acquisition module 120 and information received from the temporary forwarding service of FIG. 2, that a resident is planning a vacation to a particular destination for a specified amount of time. Additionally, or alternatively, the identified trends, habits, preferences, etc., may be stored in the household database such that the related information is properly associated in the household database. For example, multiple bi-weekly shipments from a commercial address to a residence may be identified as paychecks or paystubs given the regularity of shipments and other associations.

Such other associations may include identifications that the resident of the residence has received an item at the commercial address from the same sender from which s/he has received at item at the residence. Additionally, or alternatively, the system 101 may identify the resident's interest in golfing based on identifying the resident having received multiple items or packages from golf companies or otherwise related to golf. In some embodiments, associations may be obtained from external sources (such as credit history companies) or directly from the residents themselves. In some embodiments, a resident may identify interests in a resident's account or surveys or similar methods of obtaining resident interests.

The information acquisition module 120 may serve to assist in the identification and gathering of information of the items in the distribution system. For example, the information acquisition module 120 may acquire information from items, communications, and third parties for storage in the household database. The information acquisition module 120 can be embodied in one or more pieces of item handling equipment or other devices used to process and handle items being distributed via the distribution network, for example a handheld scanner operated by a carrier. For example, the information acquisition module 120 may be embodied in equipment configured and designed to scan items and acquire information of the items. The equipment can identify, scan, and perform optical character recognition (OCR) on destination and return address information.

The information acquisition module 120 may comprise a vision or camera system configured to identify and/or capture address information and other information located on or associated with items to be distributed. In some embodiments, the information acquisition module 120 comprises any other means for identifying and capturing information about items being distributed. In some embodiments, the information acquisition module 120 may share equipment used to identify items for services of the item delivery. In some embodiments, the equipment may identify items for address change, temporary mail hold, or forwarding services. These existing services may currently identify and acquire address information to perform the requested services. Such shared use with existing technologies may reduce costs and simplify integration of the system 101. For example, the address change or temporary mail hold services may utilize equipment or acquire information noted in FIG. 2 which may be shared with and/or gathered by the information acquisition module 120.

The information acquisition module 120 may be configured to generate comprehensive profiles associated with each residence or resident for storage in the household database. These comprehensive profiles may include information regarding the residents (for example, the people) that live or work at a particular residence, transactional behavior of the residents, and entities that send items to the residents. Additionally, the comprehensive profiles may include internal links or associations with other comprehensive profiles. For example, the comprehensive profile for a commercial address may include a link or association with a residence where one or more of the residents that work at the commercial address lives. The system 101, for example, one of the information acquiring module 120, the information analysis module 130, or the household database in the memory 115, may generate these internal links or associations for storage in the household database by analyzing information already acquired and stored in the household database or memory 115. As noted above, the information acquisition module 120 may also be configured to include information received in relation to the services referenced in FIG. 2 in the comprehensive profiles. For example, a resident's request for an address change may be communicated to the information acquisition module 120 or memory 115 for inclusion in the household database.

The information acquisition module 120 may be configured to receive information relating to items intended for delivery and/or items received within the area corresponding to the unit delivery or intake facility in which the system 101 is distributed. In some embodiments, the information acquisition module 120 may be more centralized, located within a regional distribution facility, and may be configured to receive information relating to items intended for delivery and/or received within the entire region corresponding to the plurality of unit delivery facilities and hub facilities with which the information acquisition module 120 (in the regional distribution facility) is associated.

In the present example, the information acquisition module 120 receives information regarding the items that are destined for a particular unit delivery facility or received from a particular intake facility within the region covered by the information acquisition module 120. The information received can include, for example only, a destination, such as a destination address and recipient name; a source, such as a return address, source zip code, and sender's name; the size, weight, or other physical attribute or characteristic of the item; the service class, such as first class, bulk, and others; postage; desired delivery date; expected delivery date; date item was shipped; and any other desired item characteristic. In some embodiments, the information received may comprise one or more of the information of the data categories in columns 202 of FIG. 2. In some embodiments, the information acquisition module 120 may be configured to focus on specific information while ignoring other information. In some embodiments, when the information acquisition module 120 is focusing on items destined to the particular unit delivery facility, the information acquisition module 120 may ignore the source information for the item. Alternatively, in embodiments when the information acquisition module 120 is focusing on items received from the particular intake facility, the information acquisition module 120 may ignore the delivery information for the item.

The information acquisition module 120 receives information relating to items from a variety of sources. The information acquisition module 120 can receive information from one or more other information acquisition modules 120 at higher, lower, or similar levels in the distribution network, from a user or source via the communication module 150 or from the central processor 110 of the system or of the national distribution network. The information acquisition module 120 may use other methods to gather the information stored in the household database. For example, in some embodiments, the system 101, specifically the information acquisition module 120, may obtain the electronic information (or any other information) associated with the residence or resident from other vendors, for example, e-mail account hosts or service providers, such as internet service providers (ISPs) or phone service providers or cable providers. In some embodiments, the system may gather much of the information in conjunction with revenue generating services provided, as discussed in reference to FIGS. 2 and 3. When a customer submits a request or orders one of the services shown in FIGS. 2 and 3, the request or order may include fields for the customer's e-mail address, virtual address, phone number, and other electronic unique identifiers. An electronic unique identifier may include, for example, a phone number, an e-mail addresses, or social media user information. Additionally, or alternatively, the system 101 may acquire the information for the household database, such as a resident's work and home addresses from other sources, for example, other government agencies, etc.

The information analysis module 130 analyzes and searches the information acquired by the information acquisition module 120 and stored in the household database of the memory 115. In some embodiments, the information analysis module 130 is in communication with information analysis module 120, the central processor 110, the communication module 150, and the memory 115, and may receive information to analyze or search from any of these components. For example, the information analysis module 130 may receive item information from a third party via the communication module 150 and may search or analyze the received information accordingly. In some embodiments, the information analysis module 130 may receive information from more than one source, for example the memory 115 and the third party via the communication module 150, and perform analysis of the received information together. The information analysis module 130 may receive and analyze information regarding items received at an address or by an entity, items shipped from an address or by an entity, or items received within or shipped from a geographic region. Additionally, the information analysis module 130 may receive requests or queries for searches or analyses to perform on the information stored in the household database or information provided with the request or query. In some embodiments, the requests or queries may be received from the communication module 150, which receives the requests or queries from third parties or other systems of the item delivery system. In some embodiments, the requests or queries may be received from the revenue module 140, which may receive the requests or queries from one or more third parties or systems of the item delivery system.

In some embodiments, the information analysis module 130 may determine what information it receives or requests from the household database or another component of the system 101 based on the requests or queries received. In some embodiments, the requests or queries may be received from the system 101, for example the revenue module 140. In some embodiments, the requests or queries may be received from a third party who has been granted access to the system 101. In some embodiments, access to the system 101 may be granted to third parties that pay a fee or purchase one or more requests or queries. For example, the information analysis module 130 may receive a request or query from a third party to analyze and identify addresses in a five-block area that receive any items (for example, magazines, packages, or postcards) relating to outdoor activities (hunting, hiking, etc.) within the last year. Accordingly, the information analysis module 130 may determine it should request only information for the last year relating to all types of items received at any of the addresses within the five-block area from the household database. In some embodiments, the information analysis module 130 may identify that the request or query has the necessary permissions or that privacy rules have been met such that access to the system 101 and the information contained therein is not erroneously distributed or provided to a third party with insufficient permissions. In some embodiments, the revenue module 140 or the communication module 150 may identify that the request or query has the necessary permissions or that privacy rules have been met. In some embodiments, the permissions and/or privacy rules may be controlled by one or more of the information analysis module 130, the communications module 150, the central processor 110, or the memory 115. Once the permissions and privacy rules have been verified, the information analysis module 130 may then search the received information for any associations with outdoor activities. Thus, the information analysis module 130 may ignore any information in the household database that was relating to items received by one of the addresses in the five-block area more than a selected period such as a year ago, may ignore any items that were sent from the five-block area, and may ignore any items delivered outside the five-block radius.

The information analysis module 130 may then parse or otherwise analyze the requested and received information for the addresses within the five-block area based on relationships to or associations with outdoor activities. The information analysis module 130 may use any method of analyzing the information in the household database (and any additional information provided by any other component) to obtain the desired results based on the request or query. Accordingly, the information analysis module 130 may generate results of addresses that have received outdoor activity catalogs, packages from sports companies, hunting companies, or other outdoor activity companies, items from any of these companies, or items that comprise other associations or relationships with outdoor activities, for example, a postcard of a scenic landscape or an item having the name of an outdoor activity company as the sender or return address, or that comprises any outdoor related image on the exterior of the item. In some embodiments, the results of the analysis as performed by the information analysis module 130 may be stored into the memory 115.

In some other embodiments, the results generated by the information analysis module 130 may be communicated to the entity that requested the analysis, for example via the communication module 150 or via the central processor 110. Such communication of the generated results may comprise formatting the results in a spreadsheet including relevant breakdowns of the requested information. In some embodiments, the spreadsheet may be electronically or physically sent to the entity that provided the request or query. In some embodiments, the results may be made available to the entity that requested the analysis via a user interface. In some embodiments, the user interface may be integrated into the revenue module 140, such that when the generated results are reviewed, revenue is generated. In some embodiments, the user interface may be integrated into the communication module 150. In some embodiments, the user interface may be configured to present the results of the analysis in a helpful, easy-to-understand manner, for example in a spreadsheet or in a graphical manner.

In some embodiments, the results generated by the information analysis modules 130 in view of the request or query may be stored in the household database or in another database or memory 115. In some embodiments, the information analysis module 130 may request additional information from the information acquisition module 120 if the information analysis module 130 determines that the information stored in the memory 115 is insufficient to provide proper results to the request or query. For example, the information analysis module 130 may receive a request or query from an entity to identify females within a ten-block area have received items regarding buying a new car, and the information analysis module 130 may determine that the information stored in the household database is insufficient to provide accurate or significant results to such a request or query. Accordingly, the information analysis module 130 may request the information acquisition module 120 begin collecting additional information relating to items regarding buying a new car for residents within the ten block area.

In some embodiments, the information analysis module 130 may be configured to analyze information that is provided via the communication module 150 in conjunction with the information received from the memory 115 when responding to the request or query. For example, as discussed above in relation to the request of females having received items pertaining to buying a new car, the database in the memory 115 may not identify genders associated with the names saved therein. Accordingly, the information analysis module 130 may be configured to receive additional information from the communication module 150, for example, a list of female names. The information analysis module 130 may be configured to combine this additional information with the names received from the memory 115 to identify which names are female, and then further identify which of the female names received items related to buying a new car. In some embodiments, the information analysis module 130 (or any other module of system 101) may be configured to access the Internet via the communication module 150. Additional functions of the information analysis module 130 described in greater detail below. Upon generating results to the received requests and queries, the information analysis module 130 may communicate the results to the requesting entity via the central processor 110, the revenue module 140, or the communication module 150, or store the results in the household database or the memory 115. In some embodiments, the information analysis module 130 may access one or more external sources to automatically obtain information necessary for analysis of data in the household database, such as accessing the Internet to obtain a list of female/male names or a calendar of celebrated holidays, etc.

Additionally, the system 101 may gather information pertaining to the type, contents, source, or destination of the items sent to and received at the address. The contents of the item may comprise the one or more articles contained within the item. In some embodiments, the contents may be indicated on the item itself, may be determined from an x-ray (or other non-invasive scanning or security methods) of the item, or may be provided by the entity that entered the item into the distribution network. The entity providing the item may identify the type of the item and/or other characteristics of the item. The type of item may include whether the item is a letter, a magazine, a periodical, a package, etc. The physical characteristics of the item may comprise a weight, a size, a shape, advertisements placed on the item, other markings, decorations, or labels placed on the item, or similar physical attributes of the item. A timing of the item may comprise the elements of the timing or timeline of the item, for the example, the date when the item entered the delivery and distribution system of the item delivery service, the scheduled or estimated delivery date, or the amount of time that the item delivery service has been handling the item. Additionally, the system 101 may identify a value of the item, such as when disclosed for customs or taxation purposes.

All of this information (and more information not described above) that is automatically collected by the system 101 in the delivery and distribution of items may be stored in the household database of memory 115. The household database may be organized by various entries. For example, the household database may be arranged or organized by residence or by the resident that resides or is present at the residence. When the resident is associated with multiple residences, for example, a home address and a work address, the household database may include multiple entries for the resident or may include multiple data fields to accommodate the one or more residences and information associated with each residence. For example, the entity may receive specific items at each residence that may not be received at another residence, such as deliveries of office supplies at the work address and deliveries of personal goods at the home address.

Additionally, the information from the household database may be parsed or otherwise analyzed to generate additional information that may be further stored in the household database or other databases. Alternatively, or in addition to the identification of the residents' interests as described above, the physical characteristics of items and packages sent by a particular entity may be analyzed to determine what types of delivery or packaging services a particular resident may find useful. In some embodiments, the names of the recipient and sender of the item or package may provide information that can be used to identify goods or services of interest to the recipient or potential customers or customers of interest to the sender. For example, a package from Golfsmith may be determined to be golf related, while a package from Whole Foods may be determined to be food related.

In some embodiments, the permissions and/or privacy rules described above may be configured to protect the information stored in the memory 115. In some embodiments, permissions and/or privacy rules may also be configured to restrict access to the information acquisition module 120 or the information analysis module 130. The permissions and/or privacy rules may prevent an unapproved entity, within the item delivery service or a third party, from gathering information using the information acquisition module 120 or analyzing information within the memory 115 without the proper authorization. In some embodiments, permissions and/or privacy rules may prevent unauthorized access to one or more other modules of the system 101. Additionally, or alternatively, the system 101 may anonymize the collected information such that the results of analysis performed on information in the household database cannot be used to identify individual residents. For example, the system 101 may include in the household database of memory 115 anonymous identifiers for each resident or entity having an entry (or association) in the household database.

When reporting results of the analysis to the entity that requests the analysis, the system 101 (for example, information analysis module 130) may only provide the anonymous identifiers, such that any personal information or preferences cannot be determined or identified by the entity requesting the analysis. In some embodiments, the item delivery service may provide a service to analysis requesting entities, such that if the entities want to send an item to a resident identified in a result of an analysis, the entities can address the item with the anonymous identifier, and the item delivery service may properly route the item such that is received by the proper resident without that resident's information being disclosed outside the item delivery service. In some embodiments, the information associated with individual residents or entities may be aggregated such that the smallest portion of information that can be analyzed is a set of residents or entities.

In some embodiments, the household database generated in the memory 115 by the system 101 may further include electronic information associated with a residence. For example, the system 101 may be configured to correlate a resident's residence with one or more of the resident's e-mail address, virtual address, phone number, or any other non-physical, unique method of addressing or communication. Accordingly, the system 101 may include, in the household database, associations between physical addresses and electronic unique identifiers associated with information already stored within the household database. For example, the family described above may include two adults, each having their own cellular phone numbers and various e-mail addresses and other social media accounts. In some embodiments, the household database may create associations between the residence and the phone numbers, internet protocol (IP) addresses, e-mail addresses, virtual addresses, and other social media accounts of the two adults living at that residence.

The revenue module 140 may generate revenue using the system 101. The revenue module 140 is in communication with the memory 115, the central processor 110, the information acquisition module 120, the information analysis module 130, and the communication module 150. The revenue module 140 may generate outputs or communications to the information analysis module 130 based on analysis requests and queries the revenue module 140 receives via the central processor 110 or the communication module 150 or other manner. These analysis requests and queries may be received from third party entities or from other services of the item delivery service. The revenue module 140 may also receive communications or inputs from the information analysis module 130 in the form of results from the analysis request or query. In some embodiments, the revenue module 140 may be configured to generate additional options for revenue generation using the system 101. For example, the revenue module 140 may offer to provide information from the household database without analysis of the information or may offer to provide the ability to capture specific information from items being processed by the distribution network, among others. The revenue module 140 may be embodied as a computer or terminal having a display, a printer, and other output features, or it may be embodied as software, which is run, for example, on the central processor 110. In some embodiments, the revenue module 140 may be configured to charge fees for services offered based on the information in the household database.

For example, the revenue module 140 may request the information analysis module 130 to identify purchasing behaviors of a resident at the residence, and the revenue module 140 may provide the resident with targeted coupons or other offerings directly based on the purchasing behaviors. Alternatively, the revenue module 140 and the information analysis module 130 may identify an interest of the resident at the specific address and may provide the resident with alternative or similar activities that would interest the resident based on the resident's other interests.

The revenue module 140 can, for a fee or extra charge, provide a display, a printout, or other output which provides or indicates a result of the information analysis performed by the information analysis module 130 or otherwise provides information regarding information or services available for purchase by a third party. Additionally, the revenue module 140 may be configured to generate an invoice or otherwise charge the entity that makes an analysis request or query or otherwise purchases information in the household database or requests specific information to be acquired, and thus may be configured to generate revenue based on the information captured and stored by the system 101 and other functions of the system 101. In some embodiments, the revenue module 140 may be configured to generate revenue by offering other services available from any of the components of the system 101 and their use in the distribution network.

In some embodiments, the revenue module 140 may be configured, for a fee, to generate and implement a new service or revenue generating application based on a request or query performed by the information analysis module 130 that involves both information stored in the household database of the memory 115 and other systems or services of the item delivery service, such as an augmented reality system. For example, the item delivery service may comprise an augmented reality system (or a similar system) that allows the item or package in the distribution system to be scanned with a phone or similar device and display, on the screen of the phone or similar device, additional information associated with the item or package. For example, the additional information may comprise a commercial associated with a product, good, or service being advertised for with the item or package.

The fee-based service implemented by the revenue module 140 incorporating the augmented reality system may allow a recipient of the item or package to scan the item or package with the recipient's phone or similar device and automatically send a response to the sender of the item or package. For example, the implemented service may allow the recipient to capture an image of the received item or package and send a response to the sender of the item or package by actuating a "soft-button" created by the augmented reality system. The soft-button may be based on the address of the sender, and, when actuated, may allow the recipient of the item to send an e-mail or physical item to the sender based on the unique identifier of the sender of the item or the unique identifier of the item or another matter. For example, if the sender's address is located on the item or package, then the augmented reality system may create a soft-button of the sender's address, such that when the recipient presses on the sender's address, the recipient is prompted to send a response to the sender's address. If the item or package is associated with a unique identifier as discussed above, for example, marked with the unique identifier or the sender identified by the return address is associated with the unique identifier, the unique identifier may be associated with an electronic mode of communication. If so, the recipient may be prompted to select the type of communication to send, physical or electronic.

Similarly, in some embodiments, the implemented service may be configured to generate soft-buttons for any information identified on the item or package or based on any information identified on the item or package. For example, if the recipient receives a holiday or event card, then the implemented service may capture an image of the item or package and provide the recipient with a soft-button based on the holiday or event indicated by the item or package. The soft-button may provide the recipient with options for sending related items to selected recipients to announce or celebrate the holiday or event. For example, the soft-button may ask the recipient if s/he would like to send cards or other items for the holiday or event indicated on the received item or package.

In one example, Federal Express (FedEx) currently engages with entities and customers in a variety of ways, for example through the sale of FedEx products and services and through tracking and delivery of items that move through the distribution network. As described above in reference to system 101 of FIG. 1B, the automated tracking and routing of items through the distribution network may be one way FedEx can acquire information regarding addresses and entities for storage in the household database. FedEx may also acquire information for the household database through the sale of products and services by FedEx to customers and through marketing materials distributed to customers or residents. For example, the products and services may include the various item distribution services and products available for purchase at a FedEx location or online, such as, for example a purchase of postage for an item. Alternatively, additional services not directly associated with the distribution of a specific item but offered by FedEx may be included, for example an address change request or a temporary mail hold or forward request, or passport services, etc. Additionally, or alternatively, FedEx may acquire the information regarding entities and addresses through sharing of information with other governmental agencies or by purchasing the information from information aggregators or similar sources, or any other information vendor.

In some embodiments, the household database stored in the memory 115 may be self-perpetuating, anonymous, and encrypted. For example, the household database in the memory 115 may be integrated with the system 600 as described below. In some embodiments, the household database may be self-perpetuating by constantly updating associations between customers or addresses in the database with information received from the customers or addresses explicitly. For example, the household database may be updated with information received from interactive elements of communications with the customer or address, such as surveys or other customer interactive feedback methods. This information, combined with information received from scanning items before they are delivered, may be used to dynamically update the household database.

Additionally, the household database may be used to provide third parties with increasingly customized offerings while allowing the customers to maintain anonymity and control that may be available from other methods of communication. The associations between customers and their addresses may be "masked" or anonymized, as discussed in more detail below, such that information distributed to the third parties without fear of the third parties identifying the actual addresses and/or other information of the customers. The household database may then further associate specific interests with the customers and/or addresses such that the third parties can be provided with more complete information, where the interests are explicit or implied from assumptions based on received items, as described herein. In some embodiments, the household database may also be encrypted.

Figure 3:
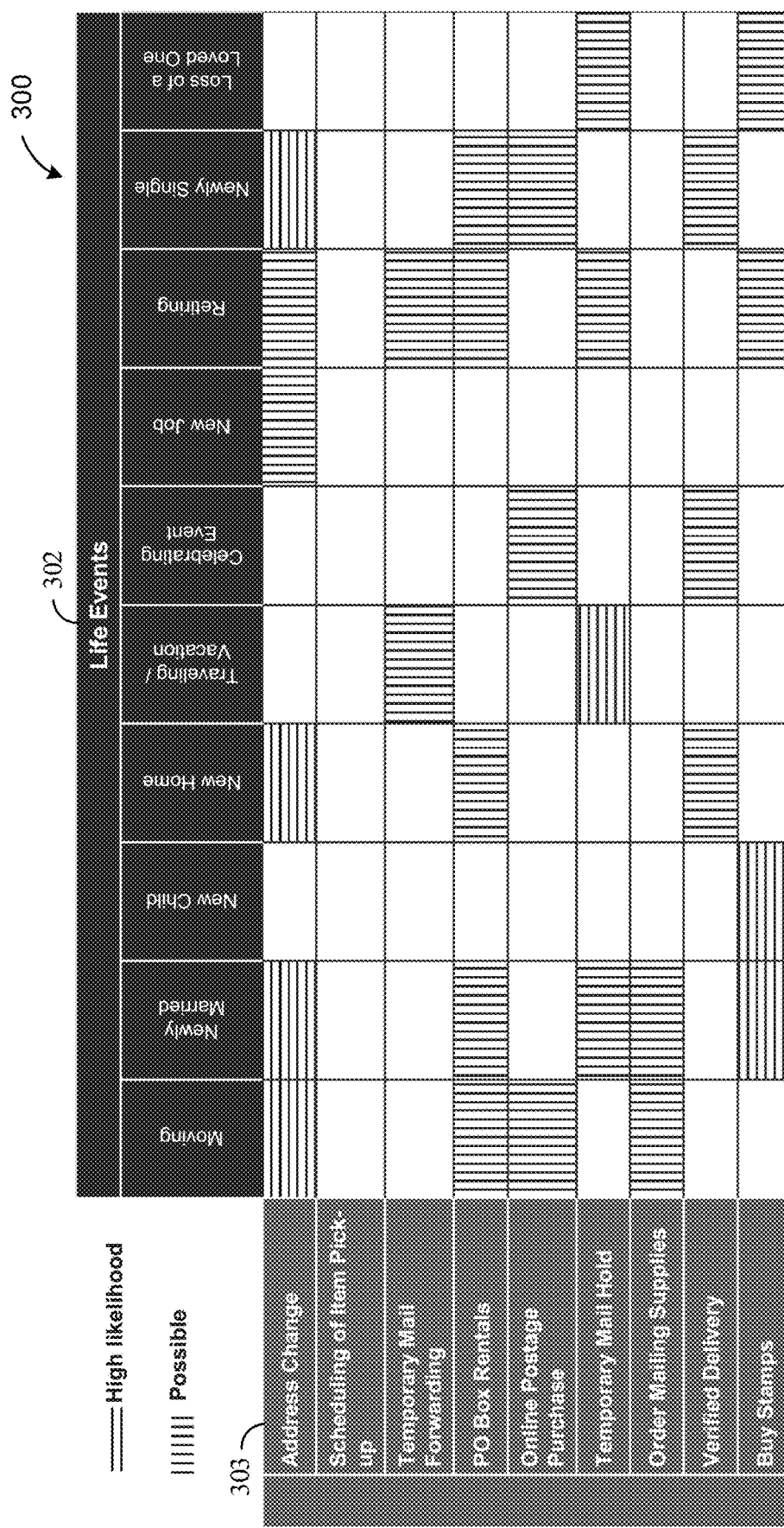
FIG. 3 is a table indicating examples of the data mining and analysis as provided by the information analysis module 130 of FIG. 1B given the services of FIG. 2.

FIG. 3 is a table 300 indicating examples of the data mining and analysis as provided by the information analysis module 130 of FIG. 1B given the services of table 200 in FIG. 2. The columns 302 of the table 300 represent "Life Events" that may be determined or otherwise identified by the information analysis module 130 based on an analysis of the information acquired by the system 101 and stored in the household database. The rows 303 of the table 300 represent the services provided that may generate the information that, when analyzed, may be used to determine or identify a possibility or likelihood of at least one of the "Life Events" of the columns 302 having occurred or upcoming. In some embodiments, the analysis may involve comparing customer requests for one or more of the services of rows 303 with previously gathered information and statistics regarding the request for the one or more services of rows 302 and the results or association of the "Life Events" of columns 302. For example, the previously gathered information and statistics may show that when the customer requests an address change service, the customer is moving over 90% of the time when compared to all address change service requests. Alternatively, or additionally, the previously gathered information and statistics may be acquired by the system 101, where customer requests of the services of rows 303 may be tracked to determine what "Life Events," of columns 302, if any, occur in association with the services of rows 303.

The body of the table 300 indicates the possibility and/or high likelihood of identifying the Life Events in the columns 302 based on the service in the rows 303 of the table 300 using hashing of corresponding cells of the table 300. For example, table 300 indicates that the address change service may provide a high likelihood of identifying or otherwise determining that the customer requesting the address change service is at least one of "Moving," "Newly Married," purchasing or having purchased a "New Home," and "Newly Single." Thus, the corresponding cells in the table 300 of FIG. 3 are hashed to indicate the high likelihood. Alternatively, a customer of the address change service may be identified or otherwise determined as only possibly having or having a moderate likelihood of having a "New Job" or "Retiring," and thus the corresponding cells are hashed accordingly. As shown in table 300 of FIG. 3, cells shown having vertical shading have been identified as "possible" or "moderately likely" life events, while cells shown having horizontal shading have been identified as being "highly likely" events. Thus, when table 200 of FIG. 2 and table 300 of FIG. 3 are viewed in conjunction, the data categories of the columns 202 of table 200 can be seen to provide insight as to the likelihood of predictability of life events of the columns 302 of table 300. Thus, specific information from the data categories may be used to predict life events.

Figure 4A:
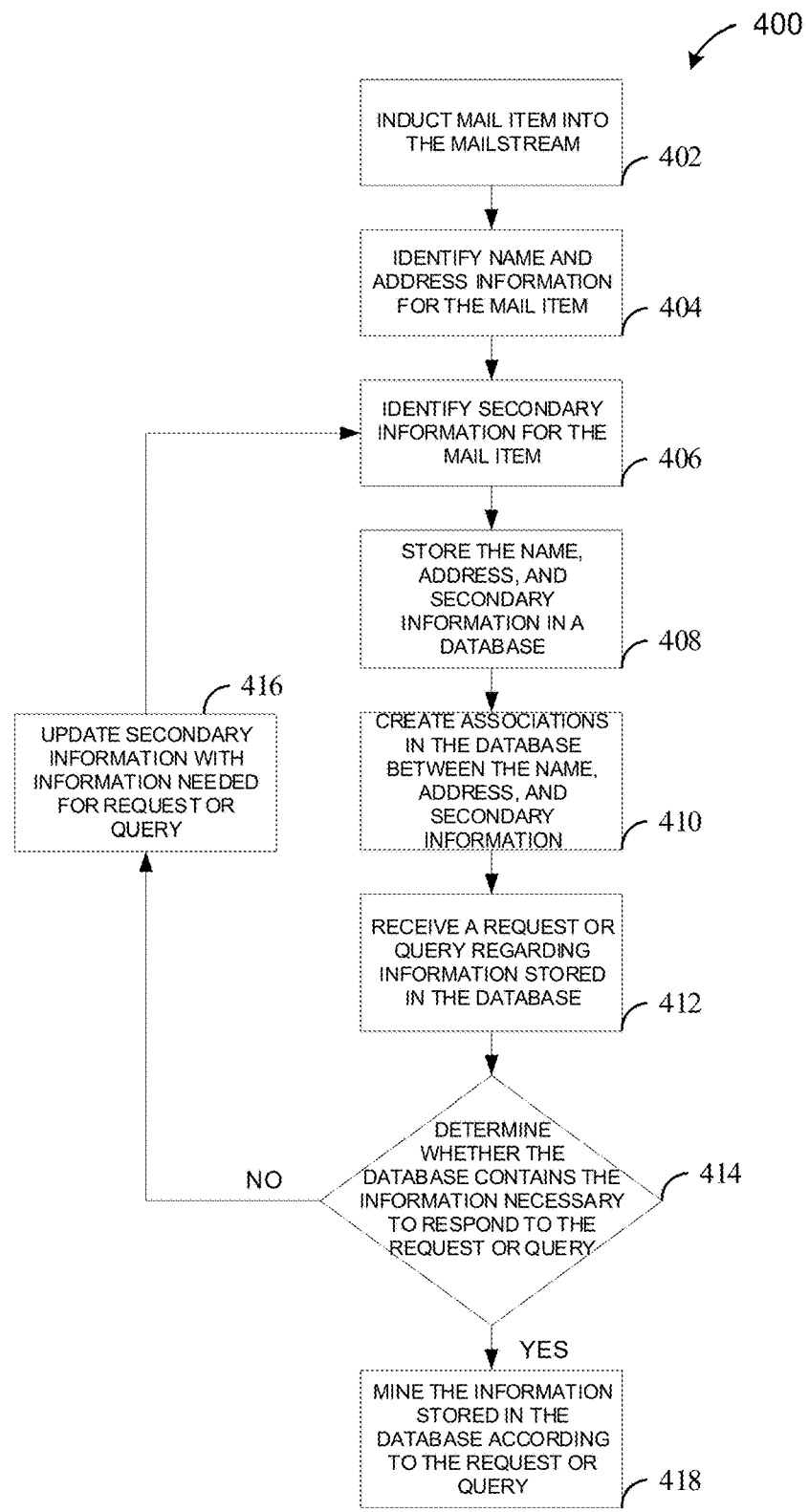
FIG. 4A is a flowchart depicting an example of a method of storing and analyzing data in the household database.

FIG. 4A is a flowchart depicting a method 400 of storing and analyzing data in the household database. Method 400 is an exemplary description of a method that may occur in a unit delivery or intake facility in any region or locality. As similar to method 400 may be run simultaneously, in an overlapping manner, or sequentially at multiple facilities across the national distribution network. In some embodiments, the method 400 may be implemented by the central processor 110, as referenced in FIG. 1B. In some embodiments, the one or more of the steps of the method 400 may be implemented by one or more of the components of the system 101, as referenced in FIG. 1B. Further details will be provided below. For ease of discussion below, reference may be made to a package and/or a letter sent from Katie Sender, having an address at 1234 Return Address Lane, San Diego, Calif., to Ryan Receiver, having an address at 9876 Destination Address Lane, San Diego, Calif.

Method 400 begins at block 402, where items are inducted into the delivery stream. As discussed above, this may comprise receipt of the items at the intake facility. Once the items are inducted into the delivery stream, various equipment that forms the distribution network at the intake facility level processes the items. For example, the items may be individually sorted from a bulk entry into the intake facility and placed in or on equipment configured to process individual items for distribution determination and analysis. In some embodiments, one or more aspects of block 402 of method 400 may be performed by one or more of the information acquisition module 120, the communication module 150, the memory 115, and the central processor 110. For example, one or more of these modules of the system 101 may be configured to receive and/or process information from equipment configured to process items. For example, the central processor 110 may receive the information from the equipment via the communication module 150 or the information acquisition module 120 and store that information in the memory 115. In some embodiments, as discussed above, the information acquisition module 120 may receive the information from the equipment directly and store it in the memory 115 without involving the central processor 110.

Block 404 comprises the identification of name and address information for the individual items before the individual items can be processed for proper routing and distribution from the intake facility to the destination address. In some embodiments, the identification of name and address information may comprise scanning the item to identify and capture an address label or address information printed or otherwise located on the item. Scanning the item may occur in response to a request from the information acquisition module 120, the memory 115, or the central processor 110. In some embodiments, identifying the name and address information includes identifying the recipient and the residence to which the item is destined as well as the sender and the return address for the item, if they exist. In some embodiments, one or more of the sender, return address, residence, and the resident may not be present on the item. In some embodiments, scanning the item may comprise capturing an image of the item, scanning the item with an optical scanner configured to identify and interpret handwritten or printed information (for example, computer printed names and addresses), or scanning barcodes, quick response (QR) codes, radio frequency identification (RFID) tags, or other identifying tags or labels capable of providing name and/or address information. Once the name and address information for the item is identified, the method 400 proceeds to block 406.

Block 406 comprises identifying secondary information of the individual items. In some embodiments, the secondary information may be identified by the information acquisition module 120 in communication with the equipment described above. In some embodiments, the central processor 110 or the memory 115 or the information analysis module 130 may be used to identify secondary information that is captured in an image or other stored data. For example, the central processor 110 or the information analysis module 130 may analyze a recording/series of images of all of the sides of the item to identify any markings or images located on the item when the images or recording is stored in the memory 115. In some embodiments, the information acquisition module 120 may receive the secondary information from the equipment handling the item. In some embodiments, the secondary information may comprise one or more physical attributes of the item, for example, a mass or weight of the item, dimensions of the item, shape of the item, or physical markings on the item. In some embodiments, the information may further include the service class, such as first class, bulk, and others, postage, desired delivery date, expected delivery date, item intake date, being the date the item was received at an intake facility or other postal facility, and other physical attribute or characteristic of the item.

As described above, the secondary information of the individual items may be captured or otherwise acquired by one or more of measuring sensors and devices configured to weigh the items and to measure dimensions of the items. For example, when the secondary information is not provided by the shipper or sender of the item, each item processed by the distribution network may be placed on a scale to determine if the item has sufficient postage for its weight, destination, and service class. The weight as measured by the scale may be secondary information for the method 400 as well. In some embodiments, identifying the secondary information at block 406 may comprise obtaining the relevant information from a shipping manifest or other similar document as provided by the shipper or sender and as may be stored in a database or system of the and item delivery service. The secondary information identified in block 406 may change dynamically dependent upon the information desired. For example, in some embodiments, a scent or odor emitted by the item may be desired to be identified for each processed item (for example, to identify flowers, food, or personal care products).

In some embodiments, the secondary information may include an indication of the type of item such as a magazine, a postcard, a letter, or a package (small, medium, large, odd dimensioned, etc.). In some embodiments, the item may comprise text printed on the item itself, such as text and/or pictures on a catalog cover or postcard or single page flyer or item. In such embodiments where the secondary information may include a large amount of text or pictures, the method 400 may be configured to analyze the text or pictures and identify keywords or pictures that best summarize or characterize the entire item. For example, the method 400 may identify that a magazine comprising pictures of hunting gear on the cover and words related to hunting is a hunting magazine or an outdoors magazine (or both).

For example, a resident may receive a magazine, periodical, or package without a return address, or having a return address but not having identifying information for the shipper or sender. If the system 101 cannot determine the shipper or sender from the address (for example, by looking it up on the Internet or in a centralized directory, etc.), then the method 400 at block 406 may attempt to gather secondary information from the item. For example, the block 406 may capture one or more images or videos of the item and may analyze the images or videos to identify secondary information. In some embodiments, a magazine or periodical related to hunting may comprise hunting gear or words related to hunting (as mentioned above) and thus may create associations in the household database of memory 115 between the resident receiving the magazine or periodical and hunting. Additionally, associations in the household database between the shipper's or sender's address and hunting may be created and saved. Additionally, or alternatively, in order to provide information for additional analysis, the associations may include geographic locations, frequency of items, interest in the items (is the item an advertisement or something requested), etc. Once the method 400 identifies the secondary information for the individual items, the method 400 progresses to block 408.

Block 408 comprises storing the information identified by blocks 404 and 406 in the household database stored in the memory 115. As described briefly above, each of the intake, hub, and regional distribution facilities may comprise more than one memory 115, for example, when each level of the distribution network has its own system 101. Thus, in such embodiments, the block 408 may comprise storing the identified name and address information and secondary information in a local household database in the local memory 115 associated directly with the intake facility. In some embodiments, a single household database within memory 115 may exist for the entire national distribution network, while the various levels of the distribution network may comprise one or more of the other components of system 101. In such embodiments, the block 408 may store the information identified by blocks 404 and 406 in the national distribution network memory 115. Once the information is stored in the household database of memory 115, the method creates associations within the database at block 410.

Block 410 comprises creating, within the household database of the memory 115, associations between identified names, addresses, and secondary information. For example, for the letter from Sally Sender to Ryan Receiver described above, the block 410 may create associations between Sally Sender's name and her address, Ryan Receiver's name, and Ryan Receiver's address. The associations in the household database may be tied to each of the various entries, such that accessing Sally Sender's name in the household database would show the associations with her address, Ryan Receiver, and Ryan Receiver's address. Alternatively, accessing Ryan Receiver's address in the household database would show the associations with Ryan Receiver's name, Sally Sender, and Sally Sender's address. For example, if the letter from Sally Sender weighs one ounce, includes the phrase "Happy Birthday," and is delivered on January 15, each of these pieces of information may be stored in the household database with associations to at least Sally's name, Sally's address, Ryan's name, and Ryan's address. In some embodiments, more or fewer associations may be made for each piece of information identified from the item.

In some embodiments, secondary information may be associated with Sally and Ryan and their respective addresses. For example, the size, source (if originating from another source other than Sally), or other markings on the item received may be stored in the household database and associated with both Sally and Ryan. The associations may include geographic locations, frequency of items, interest in the items, such as whether the item an advertisement or something requested, etc. In some embodiments, the household database may passively store information until requested for analysis. In some embodiments, the household database may only store information that is requested for analysis. The amount of information stored, the duration for which it is stored, and the type of information stored may dynamically change based on a frequency of analysis for a type of information. For example, if a type information is often analyzed, then the household database may store that information indefinitely. However, if the household database determines that a type of information was only requested for analysis once in the past year, then the household database may store that information or a finite amount of time. In some embodiments, the type of information (i.e., categories of information) may be designated priority numbers or other similar identifiers to indicate importance or to track how long to store the information. Once the associations are created and saved within the household database, the method 400 proceeds to block 412.

At block 412, a request or query is received. In some embodiments, the request or query may comprise a request to analyze and search the information stored in the household database to provide all items associated with a particular keyword, term, characteristic, etc., for example to search for residents that have received items associated with hunting or to identify residents that have received birthday items. As an additional example, the request or query may be received that requests the names of all persons within a zip code that have received an item relating to golf. Such requests or queries may come from third parties outside the item delivery service, for example a golf equipment supplier. However, in some embodiments, the item delivery service may submit its own requests or queries, for example when trying to identify customer behavioral trends and preferences and/or trying to identify new services to provide to customers that would increase revenue. Once the request or query is received, the method progresses to block 414.

Block 414 comprises determining whether the household database contains the information necessary to respond to the received request or query. For example, some third party or service of the item delivery service requests or queries may require analysis of information of which a sufficient amount is not stored in the household database or identified by the method 400. In some embodiments, the method 400 may progress to block 416, where the new information is added to the secondary information to be identified at block 406. For example, if a third party sends a request or query regarding the number of residences in a zip code that receive items packaged (e.g., "packaging material") in polymer foam or other temperature controlling or insulating materials, the method 400 may determine that sufficient information to provide a thorough response to the request or query is not currently available. Accordingly, the method 400 may progress to block 416, where it adds "packaging material" (or similar additional information pertaining to the request) to the secondary information to be identified at stored at block 406 and 408, respectively. In some embodiments, the method 400 may determine that insufficient information is available if the number of available associations is less than a threshold number (for example, less than 1000 records available in a zip code containing 400000 residences, etc.), while in some embodiments, the determination that insufficient information is available may be based on an algorithm or other criteria.

However, if the received request or query is determined not to require information not stored in the household database, then the method 400 may proceed to block 418. At block 418, the method 400 mines or otherwise analyzes the information stored in the household database according to the received request or query. In some embodiments, the results of the analysis may be provided in the form of a listing of information from the household database that meets the requirements of the request or query. For example, if the query requests the names of all people on a street that received a package from a specific online retailer, then the results may be a list of all the names that have received a package from the retailer. Alternatively, the results of the analysis may comprise statistical information. For example, the request or query may involve determining how many residences in a zip code made purchases following a mass mailing to all residences in the zip code compared to the number of residences in the same zip code that made purchases following a targeted mailing campaign. Additional details regarding the methods for exemplary requests or queries are discussed below.

Once the method 400 returns the results to the request or query, the method 400 repeats or ends. In some embodiments, within a single system 101, one or more of the block 402-418 may be performed simultaneously. For example, while the method 400 is mining the information in the household database at block 418, the method may also be identifying information from an item in blocks 404 and 406 and storing the identified information from another item in block 408. In view of the amount of items processed on a daily basis, such ability to simultaneously identify information from items and store identified information in the household database while the household database is being analyzed may allow the system to operate efficiently and currently, where new items are instantaneously available for analysis.

Figure 4D:
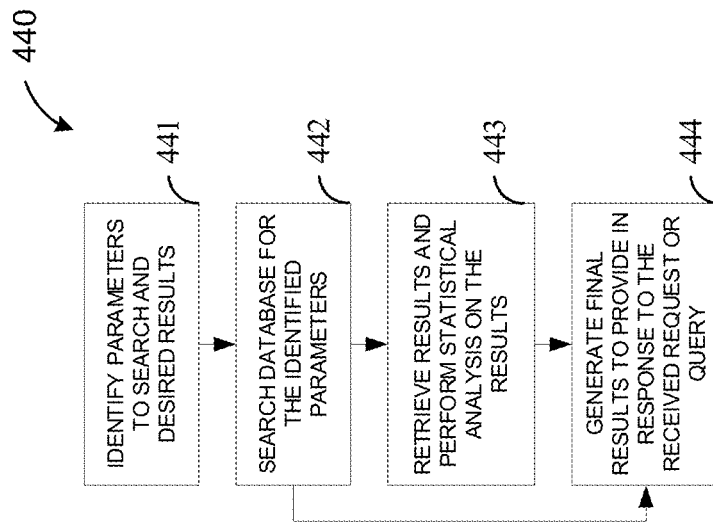
FIG. 4D is a flow chart of another example of the sub-method 440 for mining and analyzing the household database to perform statistical analysis.

In some embodiments, the block 418 mining or otherwise analyzing the household database may comprise a variety of individual sub-methods, depending on the mining or analysis that must take place in light of the request or query. Some examples of these sub-methods are shown in FIGS. 4B-4D and described below. In some embodiments, the sub-methods of FIGS. 4B-4D may be utilized in conjunction with the system 600 of FIG. 6. For example, the entities that are provided the anonymized recipient information discussed in further detail below may request that information through any one or more of the processes of FIG. 4B-4D.

FIG. 4B depicts a first example of the sub-method 420 for mining and analyzing the household database in a general manner, for example, mining and analyzing the household database to provide a list of residents or residences that have specific associations in the household database. The method 420 may begin with block 421, where the method 420 identifies parameters from the request or query for which the household database is to be searched. In some embodiments, this may comprise identifying the desired search term from the search request. For example, when the request or query comes from a third party requesting a listing of all residences that receive magazines related to golf, the block 421 of method 420 may identify "golf" and "magazines" as the search terms for which the household database should be searched.

At block 422, the method 420 may search the database for associations including the identified terms or parameters from block 421. Searching the household database may comprise utilizing the information analysis module 130 described above in relation to FIG. 1B. The searching may comprise finding all the residences that receive magazines and analyzing for any associations of magazines with golf. The information analysis module 130 may perform the analysis of the household database using any methods or processes for analyzing and searching databases. Once the household database has been searched, the method 420 may generate the search results from the search and provide the results to the party that provided the request or query. As discussed above, in some embodiments, the results provided to the party that provided the request or query may be anonymized such that the party may be unable to identify individual residents or entities and may not have access to any personal or identifying information for the residents or entities in the results. Instead, the party may receive anonymous identifiers that the item delivery service may associate with the associated should the party send an item addressed to the anonymous identifier. In some embodiments, the item delivery service may randomly change the anonymous identifiers associated with each resident and entity such that the party may not be able to identify the associations.

In some embodiments, the item delivery service may be able to identify residents that have specific associations or receive item(s) that meet specific requirements, and thus gather, analyze, and provide that information to third parties that may provide goods or services similar to the associations identified. Such information may allow the third parties to perform targeted marketing campaigns, where advertisements and/or promotional materials are only sent to those residents identified as having an interest in the third parties goods or services, as determined by having previously received an item associated with the goods or services. Additionally, the item delivery service may be able to identify resident behavioral trends and preferences, based on the analysis of previously received items. The item delivery service may benefit from providing the information to the third party as well as the potential for increased delivery of items to the residents identified by the analysis. Additionally, or alternatively, the item delivery service may obtain fees without providing the information to the third parties, instead maintaining the information internally and preparing and sending the marketing items directly to the identified residents.

FIG. 4C is another example of the sub-method 430 for mining and analyzing the household database to predict future actions and events. For example, the method 430 may identify parameters to be searched in the household database at block 431. However, in some embodiments, unlike the sub-method 420, the parameters to be searched may not come from a request or query, but instead may come from an item that is being processed in the distribution network. In some embodiments, the parameters to be searched in sub-method 430 may come from a request or query. Regardless of the source of the parameters, the method searches the household database for the parameters at block 432. Once the method 430 obtains the results from block 432, it progresses to block 433.

At block 433, the method 430 predicts a future event based on the results obtained in the search of block 432. For example, the search at block 432 may involve identifying ranges of dates where a resident received a large number of items but where the resident did not send an increased number of items. Such a range of dates may be identified as a birthday or other event celebrated by the resident. Alternatively, a search at block 432 that involves identifying ranges of dates where the resident both receives a larger number of items than average and also sends a larger number of items than average may result in the determination that this identified range of dates includes a holiday that is celebrated by multiple residents at various residences. In some embodiments, images of the items sent and received may be analyzed to determine that the identified range of dates includes a religious, national, or other holiday.

Thus, the item delivery service may be able to identify residents that celebrate specific holidays or participate in specific ceremonies or events, and thus gather and provide that information to third parties that may provide goods or services associated to those holidays, ceremonies, or events. Additionally, or alternatively, the item delivery service may be able to use the identified results to provide additional services to the residents, for example offering bulk pick-up or delivery for multiple items or providing reduced shipping costs for items shipped during specific date ranges.

FIG. 4D is another example of the sub-method 440 for mining and analyzing the household database to perform statistical analysis. For example, the method 440 may identify parameters to be searched in the household database at block 441, similar to methods 420 and 430 described above. However, the parameters to be searched in the household database may essentially comprise two separate searches for different time points. For example, if the request or query wishes to determine if targeted items are more effective than items distributed to a general audience, then two searches of the household database may be performed, for example one before the targeted item and one after the targeted item. Depending on the analysis request or query, different frequencies or relationships may exist between the searches. At block 442, the method 440 searches the database for the desired results and progresses to block 443.

At block 443, the method 440 may retrieve the results identifying differences between shipping habits of residents in a specified area before and after the targeted or general item from the third party was distributed. For example, if residents within a first area received targeted items in the first area increased consumption of the advertised good or service by 20% after receiving the targeted item while consumption by residents within a second area that received general items in the second area increased by only 10% after the general item, then the method 440 may identify that targeted items are more effective than general items. Such information may be reported as the result of the analysis request or query at block 444. Alternatively, instead of proceeding to block 443, the results of the search of the household database may be returned to the party that made the analysis request or query so that the party may perform the further analysis via block 444. Additionally, or alternatively, the method 440 may perform additional analysis of statistics identified in the search at block 442, and may provide such statistical analysis to the party that provided the analysis request or query. Alternatively, or additionally, information from retailers may be gathered and analyzed to identify an increase in sales in local or national stores to areas that received increased items, etc., to identify a correspondence between the increased items and the potential for increased sales. Such information may be provided by the item delivery service to potential clients to indicate the potential increase of sales that can be attained by using specific items, as may be identified by the item delivery service.

Other uses for the analysis and mining of the information in the household database may be provided as identified below without reference to a flowchart. In handling millions of items each day, the distribution network has access to millions of addresses, return addresses, item descriptions, and frequency of delivery, among other information, that can be acquired from the items being handled. For example, the system 101 may identify bills received by a resident, for example, a water bill, electric bill, phone bill, or any other bill that the resident may receive at its residence. Accordingly, system 101 may be able to update the household database to indicate what utilities the home having a particular physical address uses, and such information may be provided to utility providers or used to establish additional services offered by the USPS or other merchants, suppliers, etc. Additionally, the household database may include the frequency the bills are received or how often payments are shipped from the home on time or late. Accordingly, the information in the household database may be used to remind the resident of due dates for bills or warn of a bill that has not been received or a payment that may have been lost in transit.

In some embodiments, the system 101 may be capable of estimating or identifying a probable range of salaries for a neighborhood based on the collective shipping habits of the neighborhood. For example, if, on average, the neighborhood spends a given amount on postage each month or often receives items from high end (or otherwise expensive) retailers or stores, the system 101 may determine that the neighborhood probably has a given salary range. Such a determination may involve acquiring external information, for example information identifying the average salary of a household that shops at the high end retailer or statistical information associating average postage purchased with average salary, etc.

Alternatively, the system 101 described above in relation to FIGS. 1B-4D may be configured to integrate with existing services. In some embodiments, the system 101 may be integrated into the system 100 and utilized by service subscribers (as described in further detail below). For example, when a delivery address is identified for an item entered into the distribution network, the information analysis module 130 may identify in the household database that the destination address or resident has an account with the USPS that allows additional communications or features. These additional communications or features may include electronic or physical communications or any other mode of communication. For example, the information analysis module 130 may identify that the destination residence or resident has requested electronic notification of any packages or other items that enter the delivery stream destined for the residence or resident. Accordingly, the information analysis module 130 may provide that information to the central processor 110 or other external module or system via the communication module 150 so that the residence and/or resident are appropriately notified. If the information analysis module 130 does not identify a request for electronic notification, such information may be provided to the revenue module 140 which may send an offer to the residence or resident regarding the electronic notification services. In some embodiments, such advance notification may allow residents and/or residences to filter items, requesting the USPS to return or destroy items that the resident or residence does not desire or did not request.

In some embodiments, the requests or queries are generated by the item delivery service and may effectively run continuously such that they provide results in real time while customers are using services of the item delivery service. For example, if a customer is purchasing postage online via a USPS service, then the USPS may recognize the customer via an online account identifier, for example, a name, user name, address, payment information, etc. The USPS service may automatically query the household database for any information regarding upcoming life events for people to whom the customer has sent an item recently, etc., so as to offer targeted services to the customer. For example, the request or query may identify people to whom the customer has sent a threshold number of items to, people to whom the customer is related, people from whom the customer has received items celebrating the same or similar life events, or any other parameters. The USPS service may then provide the customer with reminders or notifications of identified life events, for example an upcoming birthday for a sister or an anniversary for the customer's parents. Accordingly, the USPS may ask the customer if he would like to send a gift, card, flowers, etc., and provide such services via the same interaction with the customer.

In some other embodiments, the requests or queries may function as background services, where the timeliness of the results is not as critical and where the request or query need not be triggered by action from a customer. For example, the USPS may provide a service of providing reminders of upcoming or identified life events in one or more people a customer knows. The USPS service may be configured to automatically provide reminders at least a month in advance. Accordingly, the USPS service may request or query the household database to provide a list of identified upcoming life events and the associated people on a scheduled basis (for example, the first of the month) without being triggered by an action of the customer. The customer may receive an electronic or other communication to remind of upcoming events, etc.

In conjunction with the discussion of the Life Events as referenced in FIG. 3, life events such as birthdays and holidays or cultural aspects such as religion, ethnicity, or heritage may be identified from a more thorough analysis of the stored information. For example, when a particular addressee or entity receives items within a specified duration (for example, one week) in successive years without corresponding items being sent from the particular address or entity during the same duration, the information analysis module 130 may determine that within the specified duration is a birthday or other annually celebrated life event (for example, an anniversary). Alternatively, if the particular address or entity receives items within the specified duration in successive years with corresponding items being sent from the particular address or entity during the same duration, the information analysis module 130 may determine that a celebrated holiday or event exists in the duration (for example, a religious or cultural holiday or celebration). Thus, in some embodiments, durations when the address or entity receives items without sending similar quantities of items may indicate that an event celebrated by the address or entity occurs in a proximity of the duration. In some embodiments, durations when the address or entity receives items and sends similar quantities of items may indicate that an event celebrated by both the address or entity and other addresses or entities occurs in the proximity of the duration.

Once the information analysis module 130 identifies a possible event, such information may be provided to third parties or used by the item delivery service to generate revenue. For example, in some embodiments, the item delivery service may offer value added services to individuals who are celebrating an event where they receive items, such as, for example, offers to hold items if the recipient may be traveling or offers to provide pre-addressed and pre-posted thank you cards or letters based on the number of items received at the address relating to the event being celebrated. When the information analysis module 130 identifies the possible event that is celebrated by many addresses or entities (such as the religious holiday mentioned above), the item delivery service may provide offers to provide event appropriate, pre-addressed and pre-posted cards or letters based on the addresses and quantity sent in previous years. For example, if the resident at the particular address sent an average of fifty holiday cards over the last five years, the USPS may offer to supply the resident with fifty holiday cards, pre-posted and pre-addressed with the fifty addresses to which the resident most recently sent holiday cards. In some implementations, the pre-addressed items may be addressed using anonymized information to ensure only appropriate people are provided with identifying information (e.g., to avoid issues if the pre-addressed items are intercepted by another individual in the home, etc.).

In some embodiments, the item delivery service may use the information acquired and stored in the household database of the memory 115 to identify service metrics. Based on the identified service metrics, the item delivery service may offer customers promotions or services to promote improved customer relations. For example, the information analysis module 130 may be configured to identify excessive delays in distribution of items by the distribution network. When the information analysis module 130 identifies that a particular address or entity is affected by excessive delays or other issues in the distribution of items to the address or entity or from the address or entity more than average, the item delivery service may offer the address or entity promotions or services to curry favor with the resident.

In some embodiments, the item delivery service may identify an item that is to be delivered to a destination address where a first delivery attempt failed or where first delivery attempts frequently fail (for example, more than a threshold percentage of times). Accordingly, the item delivery service may use data in the household database to identify the recipient and associated communication methods (e-mail, phone, item delivery service accounts, etc.) so as to try to contact the recipient to schedule a convenient delivery option and reduce automated delivery attempts that may fail. Such communications may reduce expenses for both the item delivery service and the recipient of the item because the item delivery service may not attempt to deliver the item and save associated costs and expenses while the recipient may not waste time and expenses waiting for the delivery of the item.

If the recipient does not have any associated communication methods in the household database, then the item delivery service may use this opportunity to send an offer of the available services with an example benefit to the recipient. For example, a service of the item delivery service may monitor attempted delivery scans as processed by the item delivery service distribution network. These attempted delivery scans may be performed by carriers attempting to delivery items but being unable to do so, for example due to the recipient not being available at the destination address. The associated addresses and recipient information may be identified for these attempted delivery scans, and the household database may be searched to identify those recipients or addresses associated with item delivery service customer accounts. If the recipients and addresses do not have customer accounts, the household database may be searched for associated contact information (phone, e-mail, social media) for the recipients and addresses. If customer accounts or other contact information is identified in the household database, the item delivery service may coordinate delivery of the items via those means. If the customer accounts or other contact information is not identified, then the item delivery service may provide offers for such services to the corresponding resident or address.

The various methods described above (for example, methods 400, 420, 430, and 440) may be performed by one or more modules of the system 101. For example, one or more of the blocks of methods 400, 420, 430, and 440 may be performed by one or more of the central processor 110, the information acquisition module 130, the memory 115, or the information analysis module 130. In some embodiments, the identifying of the parameters for the search may be performed by the communication module 150 that receives the analysis request or query, by the information analysis module 130, the revenue module 140, or the central processor 110. In some embodiments, generating the final results of the received request or query may be performed by the information analysis module 130, the revenue module 140, the communication module 150, or the central processor 110. Additionally, in some embodiments, any predicting, identifying, analysis, or other blocks performed on the results of the search of the household database of memory 115 may be performed by the information analysis module 130 or the central processor 110.

As discussed above, the household database may contain associations between a resident's e-mail address or other unique identifier and residence. Such an association may allow items to be automatically directed to the resident at the residence when the item is only addressed with the resident's e-mail address, thus allowing the resident to disclose only an e-mail address to prospective parties intending to send an item to the resident. Having one's physical address associated with one's e-mail address (or other unique identifier) may prove fruitful to maintaining privacy with vendors or other sources of items. For example, a resident ordering an item for delivery may provide the merchant providing the item with the resident's e-mail address or phone number. Accordingly, the merchant sending the item may address the item to the resident using only the resident's e-mail address or phone number. When the item is received by the item delivery service, the item delivery service may access the household database to identify a residence (physical address) associated with the e-mail address or phone number. Then the distribution system may automatically route the item to the appropriate residence. In some embodiments, the distribution system may apply the resident's physical address to the item to ease delivery of the item, while in other embodiments, only the e-mail address may be applied to the item. For example, the distribution system may apply the address according to the anonymized information described below in relation to FIG. 8 (e.g., utilizing an Intelligent Mail Barcode® (IMb™, a trademark of the USPS)). If the e-mail address or phone number is not associated with a physical address, then the item delivery service may attempt to communicate with the resident using the unique identifier by sending an e-mail to the e-mail address or calling the phone number to obtain the proper physical address. Alternatively, or additionally, the item delivery service may return the item to the sender if no association between the unique identifier and physical address is found.

Additionally, tracking items and packages moving through the item delivery service distribution network may also provide opportunities for the item delivery service to gather information for the database. When providing item or package tracking updates, the item delivery service may provide customers with the option to receive real-time or other updates via social media or text message or e-mail, thus providing an additional resource for gathering information for the database.

The household database described above may allow the item delivery service to leverage the data gathered by any of the item delivery service offered services as well as data gathered in the normal course of delivering and distributing items and packages to physical addresses. In some embodiments, the household database may include payment information, for example, a credit card or debit card number, a bank account number, a PayPal account, or any other electronic payment method identifier, which may be associated with a specific entity or physical address. This payment information may be used to allow automatic or manual payment of services by a customer (a sender or a receiver).

Figure 5:
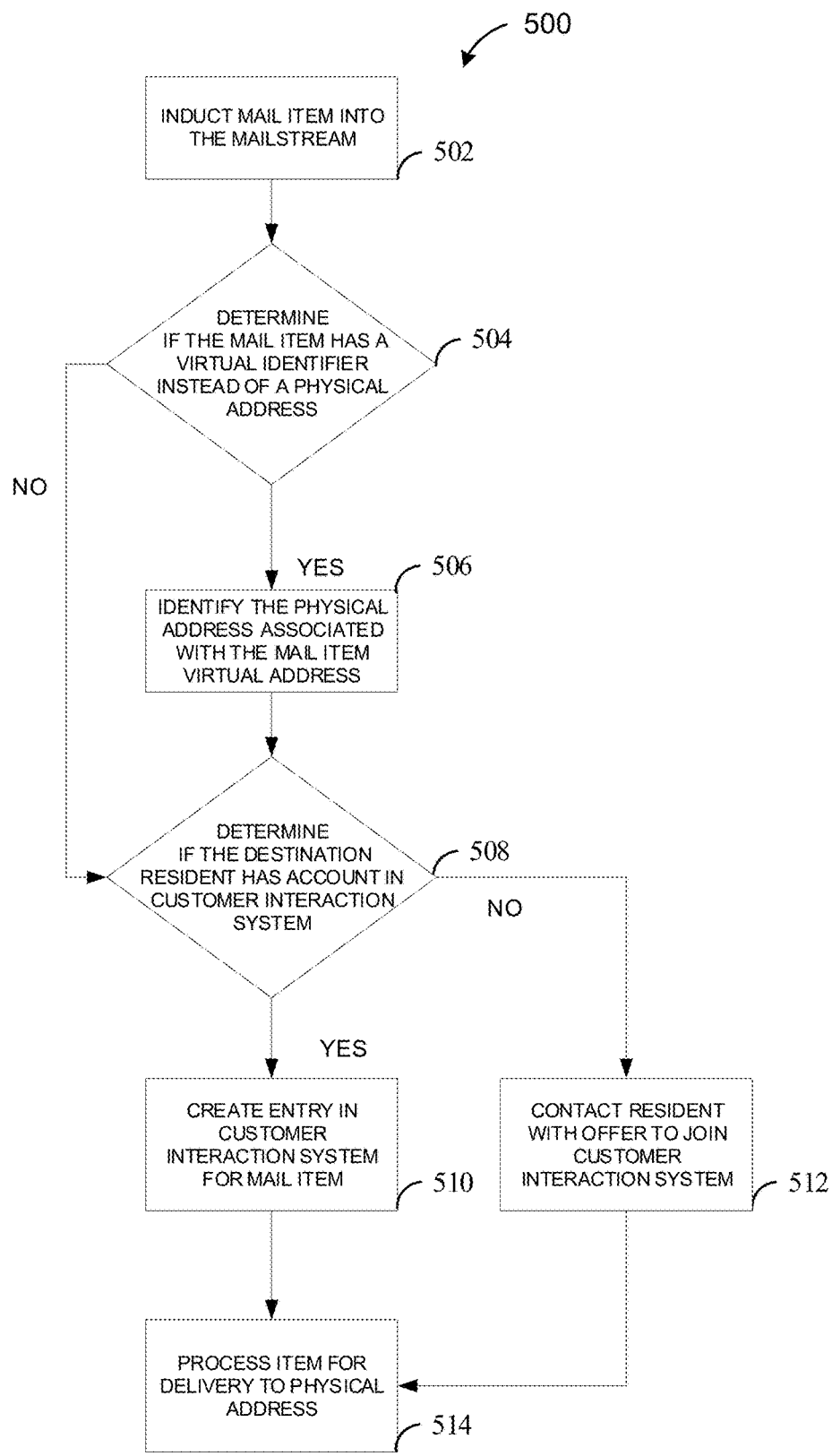
FIG. 5 depicts a process flow chart for an example of a method for using the household database to distribute and deliver an item having a non-physical, unique identifier as the destination.

FIG. 5 depicts a process flow chart for an example of a method for using the household database to distribute and deliver an item having a non-physical, unique identifier as the destination. At block 502, the item is inducted (or received) into the delivery stream having only a non-physical, unique (or virtual) identifier as the destination. For example, the non-physical, unique (or virtual) identifier may comprise an e-mail address, a virtual address, a phone number, a social media tag, user account information, or any other unique identifier that does not designate a physical location. A virtual identifier, as described herein, comprises any identifier that is unique to one resident or residence but does not designate a physical location. For example, an e-mail address or a phone number are virtual identifiers because they are unique to a particular entity or address but do not designate a physical location. On the other hand, a street address recognized by the item delivery service is relatively constant and cannot be changed by an entity moving geographic locations. However, an e-mail address or a phone number can move with the associated entity between geographic locations, and thus, is considered a virtual identifier for purposes of the discussion herein. Once the item has been received by the distribution network, the method 500 proceeds to block 504.

At block 504, while the item is in the distribution network, the method captures the virtual identifier or otherwise determines or identifies the virtual identifier placed on the item, for example using the information acquisition module 120 described above in reference to FIG. 1B. In some implementations, the virtual identifier may be anonymized in a IMb™ format, as described in more detail below. When the distribution and delivery system identifies that the item utilizes a virtual identifier, the system may cause the item to be handled differently than if it included a standard, item delivery service—recognized, street address. If the item does include a virtual identifier, the method 500 proceeds to block 506. If the item does not include a virtual identifier, then the method 500 proceeds to block 508.

At block 506, the method accesses the household database to identify a physical address associated with the virtual identifier. This may involve searching the household database for physical street addresses, names, and virtual identifiers. They may also involve decrypting or decoding the IMb™ using the rotating keys, etc., as described in relation to a encrypting/decrypting module. Accordingly, the physical address associated with the virtual identifier is either placed on the item (via a relabeling system) or the distribution network notes the association between the virtual identifier and the physical address and stores it in the system to simplify the distribution process. The physical address may be applied to the item via a label with the physical address, via a barcode encoded with the physical address, or via any other means of identifying the physical address on the item. Once the physical address associated with the virtual identifier is placed on the item or stored in the distribution network, the method 500 proceeds to block 508.

At block 508, the method 500 determines whether the resident to whom the item is addressed has an account with a customer interaction system. The customer interaction system may comprise a system offered by the item delivery service that allows residents and customers to create profiles to simplify repeated user of the item delivery service. For example, the customer interaction system may be used to request any of the services identified in FIGS. 2 and 3, such as the address change service or the item forwarding service. In some embodiments, the customer interaction system may comprise individual user accounts for each resident or customer that elects to use the system. The user accounts may include contact information for the resident or customer (for example, My Choice with UPS, myUSPS.com with the USPS, etc.).

If the customer does have an account with the customer interaction system, the method 500 proceeds to block 510, where an entry for the item labeled with the physical address or associated with the physical address is created in the customer interaction system. Once the entry is created for the item, the method 500 proceeds to block 514. The customer interaction system may be a system that allows a customer to identify items destined for them or items that they have sent or otherwise interact with the item delivery service (for example, purchase postage, manage PO boxes, etc.). The entry in the customer interaction system may provide the customer with a notification that an item is on its way to the customer. In some embodiments, the entry may also indicate one or more of the sender of the item, the location of the item, the timing of the item, physical parameters of the item, and a photo or image of the item.

If the method 500, determines that the resident to whom the item is addressed does not have an account with the customer interaction system, the method 500 may move to block 512, where the method may contact the resident with promotions or offers to join the customer interaction system, after which the method may progress to block 514. At block 514, the item may continue to be processed by the distribution network until the item is delivered to the resident having the virtual address.

Figure 6:
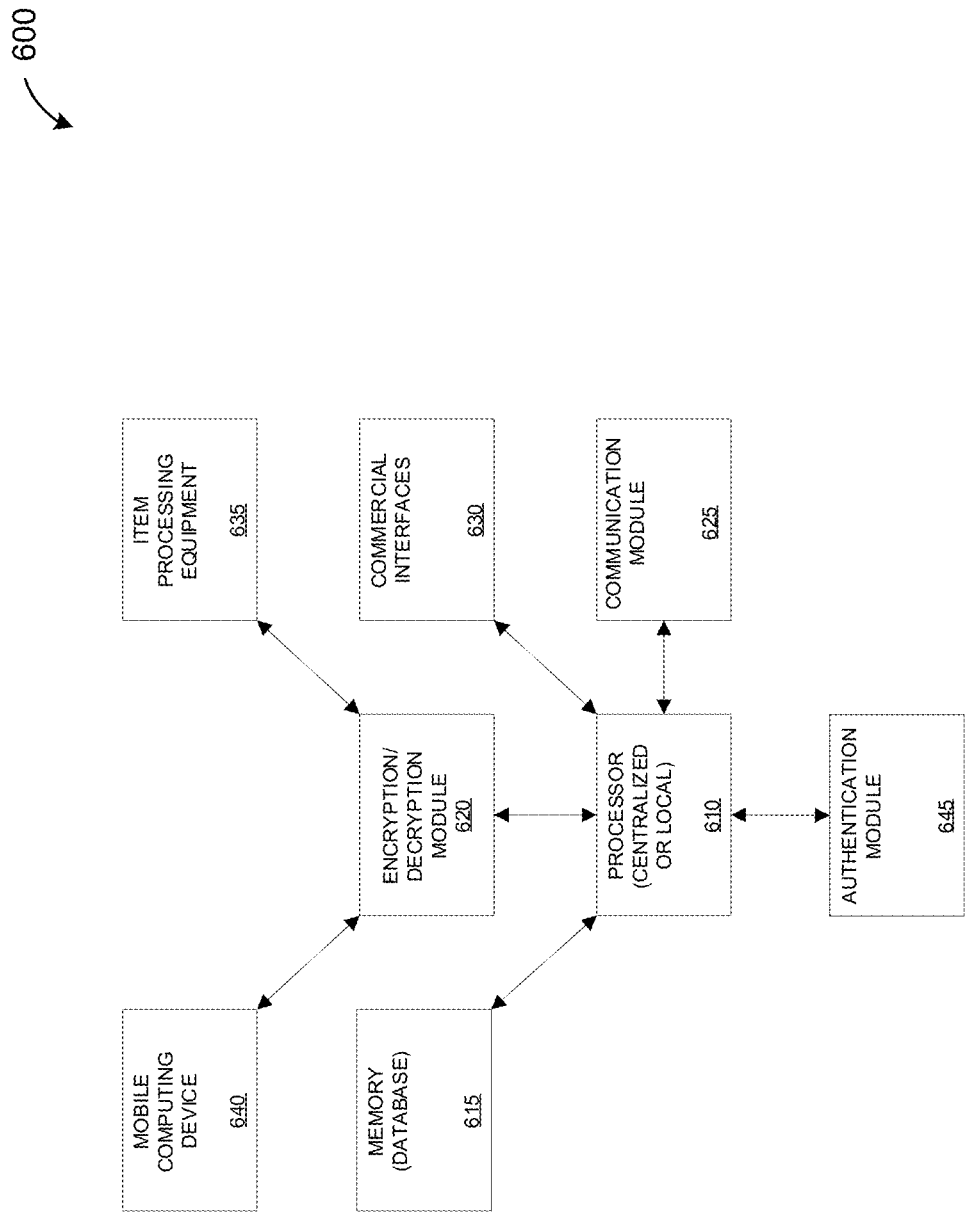
FIG. 6 depicts a block diagram of one embodiment of an encrypted delivery point information system for acquisition, control, analysis, and distribution of recipient delivery point information that may be integrated into the systems of FIGS. 1A and 1B.

FIG. 6 depicts a block diagram of one embodiment of an encrypted delivery point information system 600 for acquisition, control, analysis, and distribution of encrypted and anonymized recipient delivery point information. The delivery point information system 600 comprises a processor 610, a memory 615, an encryption/decryption module 620, a communication module 625, one or more commercial interfaces 630, item processing equipment 635, a mobile computing device 640, and an authentication module 645. In some embodiments, the delivery point information system 600 may comprise more or fewer components than shown in FIG. 6, or one or more of the components may be combined with one or more other components. In some embodiments, the system 600 may be utilized in one or both of the systems 100 and 101 of FIGS. 1A and 1B. In some embodiments, the system 600 may be configured to assist in acquiring and/or applying recipient information from mail items in the distribution system. In some embodiments, the system 600 may be configured to interface with the household database to provide information from the household database to requesting shippers in an anonymized manner. In some implementations, the system 600 may integrate with the system 101 to identify information based on requests received from shippers (etc., identify 10000 addresses in an area that receive holiday cards, birthday cards, etc., within a time period) and provide the identified information to the requesting shipper in an anonymized fashion.

In some embodiments, the delivery point information system 600 may be a distributed system. For example, the delivery point information system 600 may comprise one or more components that are centralized (e.g., the processor 610, the memory 615, the communication module 625, the encryption decryption module 620, the authentication module 645, and the commercial interfaces 630) with other components distributed in various locations, where all of the components are interconnected, for example, via the communication modules 625. In some embodiments, more or fewer components may be distributed and/or centralized. When in a distributed system with centralized components, the centralized components may be configured to interact and communicate with the distributed components. For example, a state or a city may comprise a collection of mobile computing devices 640 or item processing equipment 635 that are each distributed and that each communicate with the central components (e.g., the processor 610, the memory 615, the communication module 625, or encryption/decryption modules 620). Accordingly, when decrypting encrypted delivery point information, the distributed system 100 may funnel all decrypting functions to the centrally located encryption/decryption module 620.

In some embodiments, each piece of equipment that handles an item in the distribution system 100 may comprise each of the components shown in FIG. 6. Accordingly, when decrypting encrypted delivery point information, the item processing equipment may locally perform all decrypting functions with a built-in encryption/decryption module 620.

For ease of discussion herein, the delivery point information system 600 may be described as a centralized system with various component integrated with the delivery unit 104 as described herein. Accordingly, delivery facilities may have their own delivery point information systems 600, where the individual memory 615 and processor 610 for each system corresponds to the specified geographic regions. In some embodiments, the multiple delivery point information systems 600 each comprising processors 610 may share a single memory 615. In some embodiments, the multiple delivery point information systems 600 each have individual memory 615 but all share a single processor 610. In some embodiments, the multiple delivery point information systems 600 each have individual memory 615 and individual processors but are still interconnected via one or more communications modules 625.

The processor 610 can be embodied on a computer or a server which communicates via wired or wireless link to the memory and modules of the delivery point information system 600. In some embodiments, all processing for the various modules of the delivery point information system 600 may be performed by the processor 610. In some embodiments, the processor 610 may comprise the processor of a piece of item processing equipment or a mail computing device. Accordingly, the processor 610 may be integrated within the equipment or device and may not perform or control any distributed functions or processing. Accordingly, each individual piece of equipment or device may perform any necessary decrypting or encrypting processes locally. In some embodiments, the processor 610 may be configured to process information received from any of the components to which it is coupled. In some embodiments, the processor 610 may run software or programs stored in the memory 615 or received from any of the components of the delivery point information system 600. In some embodiments, the processor 610 may be integrated or coupled with the processor 110 of system 101.

The memory 615 is in communication with the processor 610, and (via the processor 610) the communication module 625, the authentication module 645, the commercial interfaces 630, the mobile computing device 640, and the item processing equipment 635. The memory 615 can store data and information, such as in the household database, a relational database, or in any other information storage format, such as comma delimited, etc. In some embodiments, the memory 615 may include a database of delivery point information, such as address information, and a database of encryption and decryption protocols or standards. In some embodiments, the memory 615 may also include a database of relationships between encryption/decryption protocols and delivery points and/or customers. The memory 615 can also store the operating instructions for the components of the delivery point information system 600. In some embodiments, the memory 615 may comprise an individual computing system configured to store information, the computing system having its own processor and communication modules. In some embodiments, the memory 615 may be a local memory of the item processing equipment 635 or the mobile computing device 640. When the memory 615 is local to the item processing equipment 635 or the mobile computing device 640, the memory 615 may store operating instructions for the equipment or computing device and/or may store encryption and decryption information for use by the encryption decryption module 620 and/or the processor 610 in a localized manner. In some embodiments, the memory 615 may be integrated or coupled with the memory 115 of system 101.

The commercial interface 630 may comprise an interface through which users (e.g., customers, third party shippers, etc.) can request anonymized delivery point information (e.g., encrypted delivery point information) for recipients, manage existing requests, receive computer readable codes from the distribution system, and view results from previous requests. In some embodiments, the commercial interface 630 may comprise a computer system, a processor, software running on the processor 610, a website or portal operated by an external system, or the like. In some embodiments, the commercial interface 630 may be integrated with one or more other modules of the delivery point information system 600, such as the authentication module 645 or the memory 615 or the processor 610. In some embodiments, the commercial interface 630 may allow the user to view and manage various parameters for their request of encrypted delivery point information. For example, the request may include a number of requested names and delivery points, a duration for which the encrypted delivery points may be desired to function, and any additional information associated with the request (e.g., corresponding interests of the recipients, etc.). In response to the request for the encrypted delivery point information, the processor 610 may access the memory 615 (e.g., the household database) to identify the number of requested recipient names and delivery points. In some embodiments, the identified recipient names and delivery points may be stored in a temporary database or storage file before they are made available to the commercial interface 630 for management or viewing.

The encryption/decryption module 620 may comprise one or more of an encryption module or a decryption module. In some embodiments, the encryption module may encrypt the delivery points of the identified names so that the user or shipper requesting the names and delivery points is unable to identify an actual physical delivery point corresponding to a recipient's name from the information the distribution service supplies in response to the user's or shipper's request. Thus, only the delivery point information system 600 is able to associate the encrypted delivery point information with the proper delivery point for delivery. The encryption/decryption module 620 may utilize one or more algorithms, keys, etc. The encryption/decryption module 620 may change algorithms, keys, etc., randomly or on a periodic basis in order to obscure the user's ability to reverse engineer delivery points corresponding to names of recipients. In some implementations, the encryption/decryption module 620 may be utilized to encrypt or decrypt any of the virtual, electronic, or physical information described above. For example, e-mail addresses, phone numbers, social media names, etc., may be encrypted/decrypted to ensure privacy. In some implementations, the encryption/decryption module 620 may send generate or determine sorting instructions to send to the item processing equipment 635 for proper sorting and delivery routing of items.

In some embodiments, the encryption/decryption module 620 may use different algorithms or keys for different users in order to add an additional layer of complexity to the encryption/decryption process. These encryption procedures may protect the privacy of the recipients whose encrypted delivery point information the delivery point information system 600 provides to the user. Accordingly, the user may not repeatedly send mailings to the recipients on a list of encrypted recipient information over an extended period of time without requesting updated information from the delivery point information system 600.

The communication module 625 comprises a module that allows any component of the delivery point information system 600 to communicate with one or more devices and modules external to the delivery point information system 600. For example, the communication module 625 may provide wireless or wired communication capabilities with a communication module 625 of another delivery point information system 600 or with the user described herein. The communications with the user may be via the Internet or a similar network type connection. The communication module 625 may receive communications from users, for example, requests and queries for analysis of the anonymous delivery point information. The communication module 625 may also transmit the results of the requests and queries for analysis to the requesting user. In some embodiments, for example when one or more of the components of the system are distributed, the communication module 625 may also communicate with other components of the delivery point information system 600. For example, when the encryption/decryptions functions of the delivery point information system 600 are centralized separate from the processor and/or memory, then communication modules 625 may allow for communication between the remote components.

Similarly, communication modules 625 may provide for communication between any other components that are remote from each other. Accordingly, the communication module 625 may be configured to provide communications for each of the components of the delivery point information system 600. The communication module 625 may also be configured to allow the modules of the delivery point information system 600 to access external resources, such as the Internet or a local network, etc. In some embodiments, the communication modules 625 may be integrated or correspond to the communication module 150 of system 101.

The item processing equipment 635 may comprise equipment that the delivery point information system 600 uses to scan, identify, sort, route, and otherwise distribute items from their respective sources to their respective destinations or recipients. In some embodiments, the item processing equipment 635 may comprise sensors, cameras, and a computer or a processor or software running on the processor 610, or the like. Using its various sensors, the item processing equipment 635 may identify encrypted delivery point information on an item being handled by the item processing equipment 635 and request that the encryption/decryption module 620 decrypt the encrypted delivery point information so that the item processing equipment may properly sort or route the item.

In some embodiments, the item processing equipment 635 may be integrated with one or more other components of the delivery point information system 600. The item processing equipment 635 may be configured to receive one or more signals from one or more sensors, cameras, connections with sensors or connections with cameras or other input devices configured to identify and capture physical attributes of the item. The signals received by the item processing equipment 635 may include inputs or signals comprising, for example, scans of written or printed delivery point information, scans of barcodes (e.g., an Intelligent Mail Barcode® (IMb™, a trademark of the USPS)) that is printed on the item, a mass or weight of the item, dimensions of the item, shape of the item, or physical markings on the item (such as a logo or description of the contents or a decorative bow or wrapping paper or infrared (or other non-visible) markings). In some embodiments, the item processing equipment 635 may be configured to communicate the received inputs or signals to any of the other components of the delivery point information system 600. In some implementations, the item processing equipment 635 may comprise the information acquisition module 120 of FIG. 1B. In some implementations, the item processing equipment 635 may comprise the information analysis module 130 of FIG. 1B.

The one or more mobile computing devices 640 may comprise a mobile device (for example, a cell phone or a PDA), a computer, a processor, software running on the processor 610, or the like. In some embodiments, the one or more mobile computing devices 640 may be integrated with one or more other modules of the delivery point information system 600. The one or more mobile computing devices 640 may represent input mechanisms or modules allowing the mail carrier handling the item to provide input to the delivery point information system 600. In some embodiments, the one or more mobile computing devices 640 may include a camera or other image or multimedia capturing functionality (e.g., barcode capture capability) such that a carrier manually handling the item comprising the encrypted delivery point information may be able to access the unencrypted delivery point information via the encryption/decryption module 620. In some embodiments, the mobile computing devices 640 may further include text input capabilities (such as a physical or touchscreen keyboard), such that the carrier may input descriptions or various text phrases into the delivery point information system 600. In some embodiments, the mobile computing device 640 may comprise multiple pieces of hardware (for example a camera and a PDA) or may be integrated into a single piece of hardware (for example, a smartphone, a tablet, a computer, a mobile delivery device (MDD) or a tablet computer, etc.).

The authentication module 645 may authenticate users who request anonymous recipient delivery point information via the delivery point information system 600. For example, the delivery point information system 600 may only provide the anonymous delivery point information to users who have registered and provided specified information to the delivery point information system 600 (e.g., name, address, contact information, etc.). The authentication module 645 may authenticate users via any known means, for example, user names and passwords, randomized unique identifiers, etc. Once the use is authenticated by the authentication module 645 (for example, via the commercial interface 630), the user may be allowed to request, manage, or view anonymous delivery point information.

In some embodiments, the delivery point information system 600 may be implemented or incorporated at one or more levels of the distribution system 100 described herein, such as in the delivery unit 104, the semi-regional facility 106, or the regional facility 108. In some embodiments, various equipment from any of these facilities may comprise the item processing equipment 635. In some embodiments, equipment from the facilities may be coupled to and/or integrated with the delivery point information system 600. For example, routing and sorting equipment at any of the distribution points of the distribution system 100 may communicate or be integrated with the anonymized information system when routing or sorting items that include encrypted or anonymized information. Alternatively, or additionally, the intake facilities may communicate or be integrated with the delivery point information system 600 to route and sort items that they intake that may include encrypted or anonymized information. In some embodiments, one or more pieces of the sorting and routing equipment may comprise one or more components of the delivery point information system 600 (e.g., the encryption/decryption module 620, the memory 615, and the processor 610) so that encrypted delivery point information can be decrypted locally without any need for external communications. In some embodiments, one or more of the components of system 600 may be integrated with or may comprise one or more of the modules of system 101.

Figure 7:
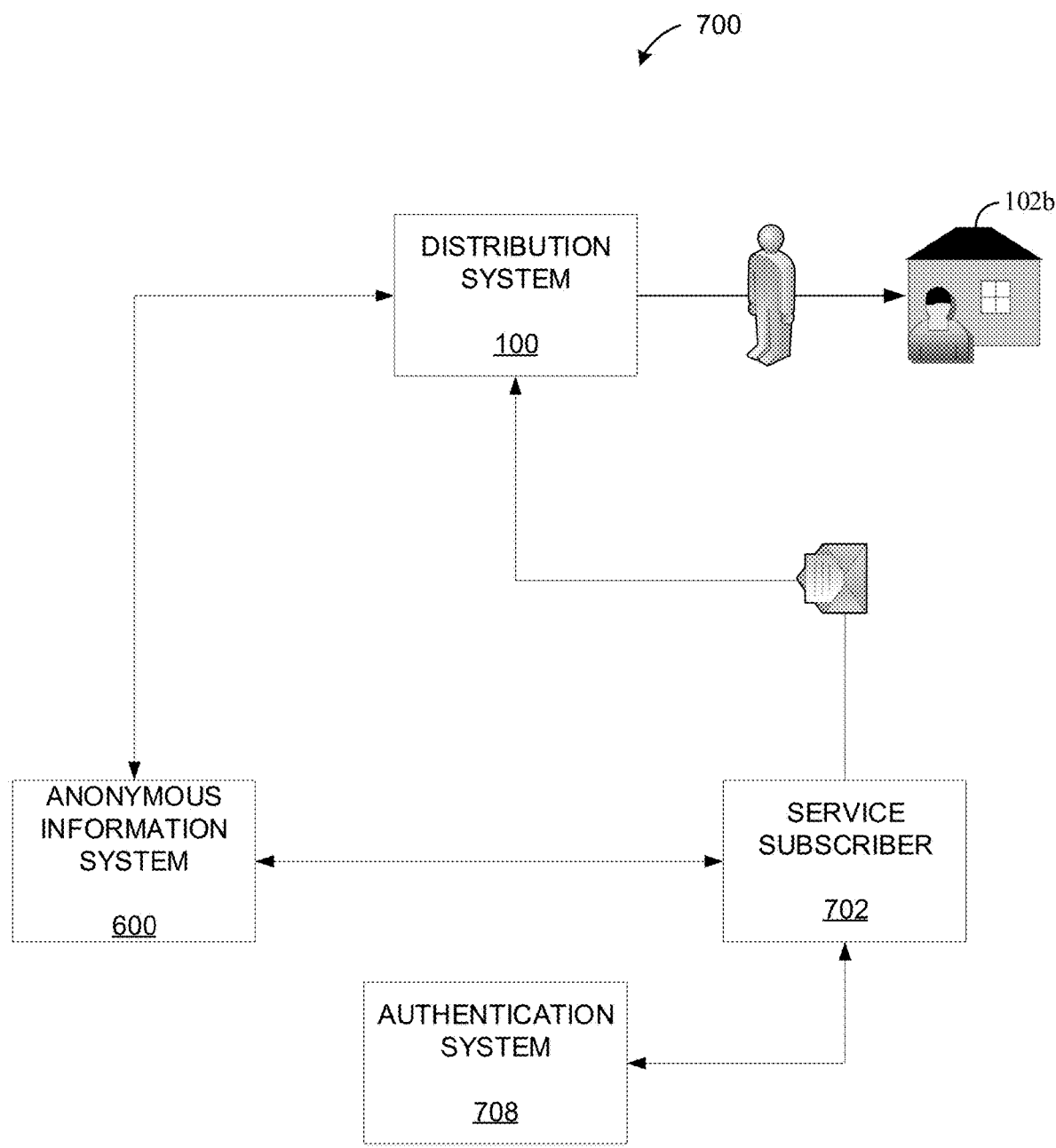
FIG. 7 depicts a graphical flow chart of the distribution system of FIG. 1A as integrated with the encrypted delivery point information system of FIG. 6 to create an anonymized shipping system for use by a subscriber.

FIG. 7 depicts a graphical flow chart of the distribution system 100 of FIG. 1A as integrated with the delivery point information system 600 of FIG. 6 to create an encrypted shipping system 700 for use by a service subscriber 702. As shown, the service subscriber 702 (e.g., shipper, customer, etc.) communicates with the delivery point information system 600. The subscriber 702 also provides items having encrypted delivery point information applied thereon to the distribution system 100. The distribution system 100 communicates with the delivery point information system 600 to decrypt the encrypted delivery point information applied to receive items and routes the items to carriers that distribute the items to the intended recipients 102B.

In function, the subscriber 702 may submit a request to the delivery point information system 600 to obtain and/or request encrypted delivery point information. The request may be submitted after the subscriber 702 is authenticated by the authentication system 708. In some embodiments, the authentication system 708 may be integrated with the delivery point information system 600. In some embodiments, the encrypted delivery point information may comprise recipient name and delivery point information. For example, the subscriber 702 may request a list of 1000 recipients at random or corresponding to a given geographic region, subject of interest, social or financial class, etc. In some embodiments, the request may be via an application program interface (API) where the delivery point information system 600 comprises an aggregate data set or database. In response to the request, the delivery point information system 600 may provide the requested list. In some embodiments, the response may include a rejection to the request with a reason for the rejection, such as an invalid request or a request that exceeds the information to which the subscriber has access, or lack of information in the delivery point information system 600 to provide the requested list, etc.

Where the request is for a list of names and corresponding delivery points or other identifying information (e.g., phone numbers, e-mail addresses, etc.), the delivery point information system 600 may provide the list in an encrypted format. For example, as described herein, the delivery point information system 600 may provide a list of names with corresponding encrypted computer readable codes, such as barcodes, or encrypted delivery point information that the subscriber 702 uses to print computer readable codes, such as barcodes, on the items. The encrypted delivery point information or barcodes may correspond to address information that the distribution system 100 uses to properly receive, sort, and route items to which the encrypted delivery point information or barcode is applied (once the distribution system 100 decrypts the encrypted delivery point information or barcodes). This process is described in greater detail herein. In some embodiments, the entire delivery point information or barcode may not be encrypted and/or the delivery point information system 600 may also provide additional information that may assist in the routing of items to which the information is applied, such as a delivery code or similar information.

Once the encrypted delivery point information system 600 provides the subscriber 702 with the requested information, the subscriber 702 may apply the received information to an item to be shipped or mailed via the distribution system 100. In some embodiments, when the subscriber 702 receives each requested encrypted delivery point information from the delivery point information system 600 as encrypted computer readable code, the subscriber 702 applies each computer readable code to individual items and introduces the items having the encrypted computer readable codes thereon into the distribution system 100. In some embodiments, the computer readable code may be a barcode, such as an IMb™, (an RFID tag, a QR code, an alphanumeric code, or any other desired computer readable code, which uniquely identifies the item and/or encodes information relating to the item.

When the subscriber 702 receives the requested information from the delivery point information system 600 as encrypted delivery point information (e.g., a string of numbers that must be converted to the computer readable code), the subscriber 702 may encode the received information to the computer readable code before applying the computer readable code to the item. In some embodiments, the subscriber 702 may provide the items and the received encrypted computer readable code or encrypted delivery point information to a third party that converts and/or prints the encrypted computer readable code onto the items. As described herein, since the computer readable code is encrypted, the subscriber 702 may not continue to send items to the named recipient 102B beyond a specified duration, after which the encryption algorithm is be changed, thus cancelling or invalidating encrypted computer readable codes after a certain time or date. In some embodiments, the encrypted computer readable codes can be single-use codes, such that once an intake, routing, or delivery scan occurs on some item processing equipment within the distribution system 100, a subsequent intake or delivery scan of the previously used encrypted computer readable code may return an error, and the item processing equipment may not further process the item, and the shipper or sender may be notified.

Figure 8:
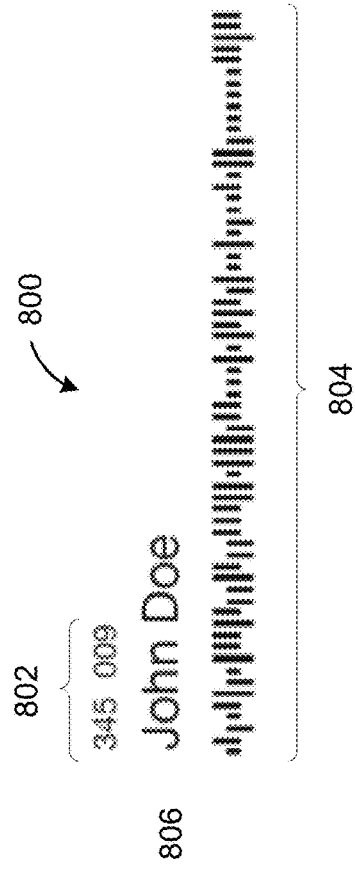
FIG. 8 is a representation of an embodiment of a computer readable code and corresponding delivery information and recipient name that may be applied to items, where the computer readable code and the delivery information may be based on encrypted delivery point information received by the subscriber of FIG. 7 from the encrypted delivery point information system for distribution by the distribution system.

FIG. 8 is a representation of a delivery point information block 800 comprising a computer readable code 804 and corresponding delivery information 802 and recipient name 406 that may be applied to items, where the computer readable code 804 and the delivery information 802 may be based on encrypted delivery point information received by the subscriber 702 of FIG. 7 from the encrypted delivery point information delivery point information system 600 for distribution by the distribution system 100. Items that are distributed through the distribution system may comprise a computer readable code as described elsewhere herein. In some embodiments, the computer readable code may allow a distribution entity, such as a commercial carrier, the United States Postal Service, or other distributor, to track, sort, and route each item throughout the distribution process. Thus, to allow for real-time tracking, sorting, and routing of items in the distribution system, each item may comprise a unique computer readable code. As described herein, the computer readable code may be a barcode, such as an IMb™, an RFID (radio frequency identification) tag, a QR (quick response) code, an alphanumeric code, or any other desirable computer readable code, which uniquely identifies the item and/or encodes information relating to the item. Each computer-readable code may be scanned by processing equipment of the distribution system, carriers of the distribution system having mobile scanners, personnel in the distribution system, transportation providers, or by other entities within the distribution chain.

In some embodiments, the recipient name 406 of the delivery point information block 800 may be replaced with a generic identifier that assists the mail carrier in delivery of the item. For example, the recipient name 406 may be replaced with the term "resident" or any other identifier when printed on the item. In some embodiments, a social media handle, email address, or the like originally used as the unique identifier as an input into the system 600 may be printed as part of the delivery point information block 800 instead of the recipient name 406. As such, the unique identifiers may assist in delivery of the item. In some embodiments, the mail processing equipment 635 can detect the unique identifiers during sorting and routing, for example during OCR scans of items and cross verify the printed encrypted information and delivery codes with the corresponding information associated with the unique identifier in the system 600. In some embodiments, the recipient name 406 may also be left blank or replaced with a vanity term, for example "potato chip lover," "lucky winner," "Mercedes driver," or the like.

In some embodiments, the system 600 may not return the recipient name 406 when delivery point information is requested, but rather only return the computer readable code 804 (e.g., comprising the delivery point/11 digit zip code) and/or the delivery information 802. In some circumstances, the system 600 may return the original name or unique identifier with its associated delivery information 802 and encrypted elements of the computer readable code 804 for relational purposes. In some embodiments, the sender may be responsible for applying/distributing the delivery point information bock 800 including the recipient name 406 field as well as creating the computer readable code 804 with appropriate mailer ID and other information. In the case where a rotating encryption keys are used (e.g., where each key is valid for a known period the system), an indication regarding which encryption key was used to generate the encrypted elements of the IMb™ may be included in the IMb™ to denote the encryption used or its valid time window. In some embodiments, the sender may incorporate this indication into the service type ID of the IMb™. This indicator may indicate to the mail processing equipment 635 which encryption key should be used for decryption of the encrypted IMb™. If the encryption key is a perpetual key and is valid for long periods or forever, then no indicator may be provided. In some embodiments, system 600 may also return the entire IMb™ and delivery information.

In some embodiments, the delivery information 802 of the delivery point information block 800 may comprise 3 digits as described herein or another combination of digits to assist the mail carrier in identifying misrouted or out of sequence items. In some embodiment, a route number may be added in carrier readable form to the beginning or end of the six digits of the delivery information 802 to assist the mail carrier. In some embodiments, many different combinations for the delivery information 802 may be used. In some embodiments, the sequence of the digits of the delivery information 802 may also be changed to adjust the delivery information indicated. For example, the delivery information 802 may be the last 2 digits of an address, the last 2 digits of an apartment number, and the 2 digits of a carrier route (e.g., 13 00 52). Another example of the delivery information 802 may be the 3 digit vehicle/route number and the stop number for that vehicle/route (e.g., R13 083). In some embodiments, the delivery information 802 and its format and/or contents can be selected to assist the mail carriers while disguising or anonymizing the address to the public or to the subscriber.

In some embodiments, the computer readable code 804 may correspond to an IMb™. As shown, the IMb™ may correspond to a four-state barcode that encodes a string of 31-digits. In some embodiments, each digit may comprise a value of 0-9. In some embodiments, the IMb™ may be replaced with any other barcode or similar computer readable code comprising a plurality of characters. The 31-digit string of the IMb™ may comprise at least five different fields, where the size of the fields may vary based on the information contained within each of the fields. The first field may comprise two digits and may correspond to a barcode identifier (BI). The BI may comprise a specific two-digit identifier assigned primarily to encode a presort identification that is printed in human readable form on an optional endorsement line (OEL) as well as a source channel identifier. The second field may comprise three digits and may correspond to a service type identifier (STID). The STID may correspond to any services that are requested for or on the item. The third field may comprise either six or nine digits and may correspond to a mailer identifier (MID).

The MID may identify a shipping entity or customer. The fourth field may comprise either six or nine digits and may correspond to a serial number. The serial number may aid in establishing uniqueness of the item to which it is applied. The fifth field may comprise zero, five, nine, or eleven digits and may correspond to a routing code. The routing code may be used for routing the item to its final delivery point. The first four fields may be described collectively as a tracking code and may be used for identification and tracking purposes of the item to which the IMb™ is applied. The tracking code may always comprise a total of twenty digits.

The routing code may comprise a delivery point ZIP code™, corresponding to the delivery point of the item. Its length may be dependent on an amount of routing information available. For example, if only the ZIP code of the recipient is known, then the routing code may comprise only the five digits of the known ZIP code, with no trailing digits (e.g., zeroes) to be added. Thus, for example, if no ZIP code is known, the routing code may have a length of zero digits. As described herein, the routing code may be encrypted for anonymized delivery point information. As only the digits of the routing code determine the destination, only the routing code needs to be encrypted so as to prevent a sender from determining a recipient's physical delivery point. In some embodiments, the entire IMb™ may be encrypted to prevent a shipper from associating a particular item with a recipient's delivery point.

In some embodiments, delivery information 802 may also be included along with the IMb™. The delivery code may correspond to a six character code divided into two three-character sequences. Each of the six characters may correspond to a value of digits 0-9 or letters A-Z. The first three-character sequence may correspond to the last three characters of the primary delivery point number in a first address line of the address of the recipient of the item, such as the house number. The second three-character sequence may correspond to the last three characters of the secondary delivery point number in a second address line of the address of the recipient of the item, such as the apartment or unit number. The two three-character sequences may be separated by a space. In some embodiments, the delivery code may not be encrypted or anonymized while the routing code of the IMb™ is encrypted. In some embodiments, both the delivery information 802 and the routing code may be encrypted. In some embodiments, only the delivery information 802 may be encrypted by the routing code is not encrypted. For simplicity, the discussion herein may describe the routing code as being encrypted by the delivery information 802 is not encrypted. The delivery information 802 can be used by a carrier to identify the delivery point or destination of an item during the carrier's delivery route. In some embodiments, the IMb™ may be configured to include one or more of the identifiers described above (e.g., virtual addresses, e-mail address, etc.). In some implementations the IMb™ may be stored in the household database of the memory 115 as being associated with one or more physical address, virtual addresses, e-mail addresses, phone numbers, social media identifiers, virtual handles, etc. so that the IMb™ may provide delivery information for any item regardless of how it is addressed.

Figure 9:
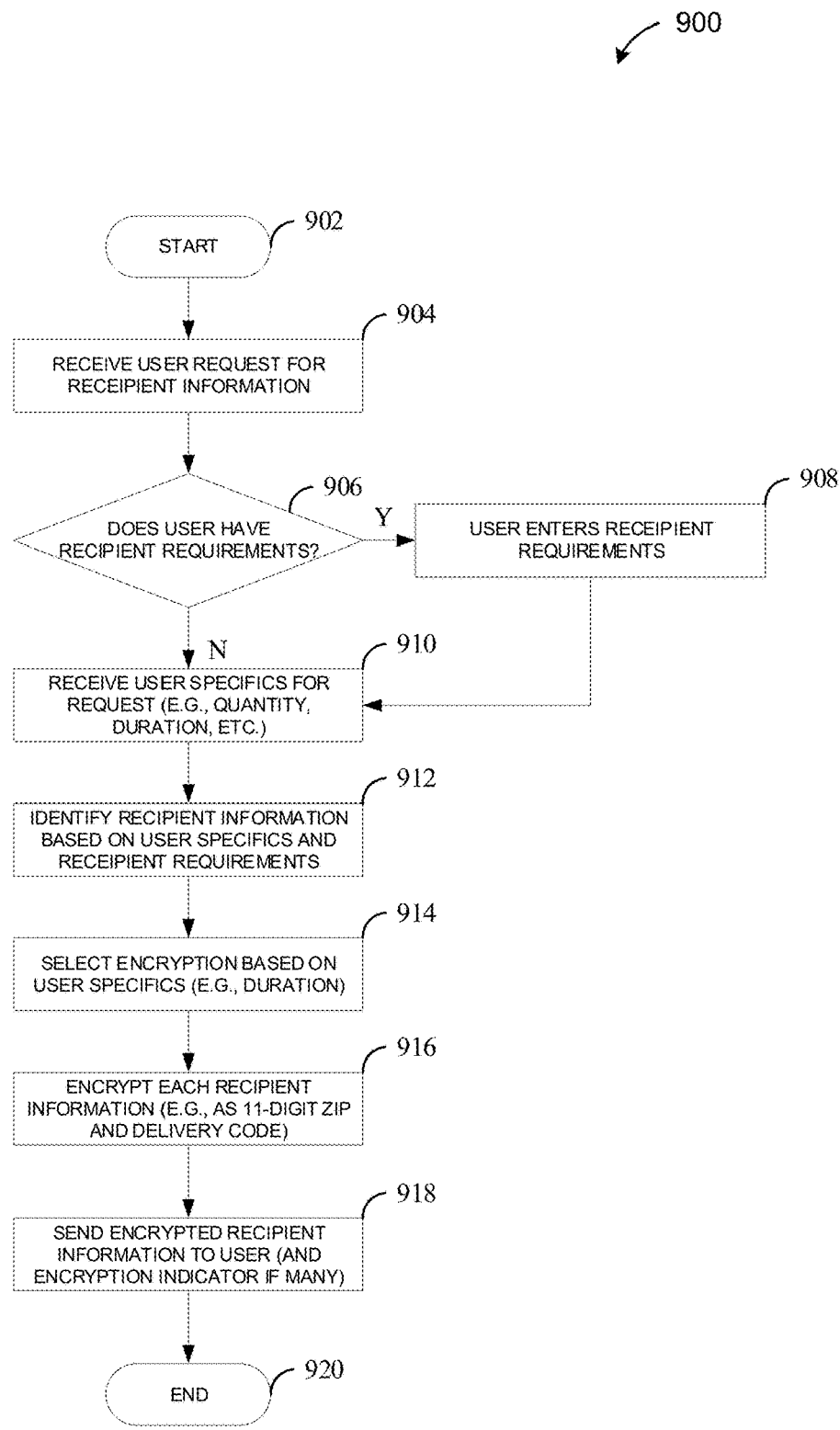
FIG. 9 is a flow chart of a method for providing an encrypted delivery point to a user based on a user request.

FIG. 9 is a flow chart of a method 900 for providing an encrypted delivery point to a user based on a user request. The method 900 may be performed by the processor 610 of the delivery point information system 600. The method 900 starts at block 902 and proceeds to block 904. At block 904, the commercial interface 630 and/or the communication module 625 receives a user request for recipient information. In some embodiments, the user may be an individual, business, or other entity that wishes to send items to one or more recipients. For example, this user request may comprise a simple query as to whether or not the method 900 or the delivery point information system 600 is capable of providing anonymized delivery point information. In some embodiments, the user request may comprise user authentication or similar processes. Once the user request is received, the method 900 proceeds to block 906.

At decision state 906, the processor 610 determines whether the user has any recipient requirements. For example, the user may request only names and delivery points of recipients who have specific interests or economic means, etc. If the user does have recipient requirements, the method 900 proceeds to block 908, where the user enters the recipient requirements, after which the method 900 proceeds to block 910. If the processor 610 determines that the user does not have any recipient requirements, the method 900 proceeds directly to block 910. For example, if the user is the publisher of the outdoor magazine described herein, the user may wish to receive only names and delivery points of people with an interest in outdoor activities. Accordingly, such a request may be included in the recipient requirements.

At block 910, the commercial interface 630 or the communication module 625 receives any user specifics regarding the anonymous recipient information. For example, the user specifics may include a quantity of recipient information (e.g., a number of names and corresponding delivery points), a duration for which the user requests the anonymous recipient information be valid, or similar details regarding the functionality of the anonymous recipient information itself. Once the user specifics are received at block 910, the method 900 proceeds to block 912. For example, user specifics may include the request for 10000 names and delivery points or a request that the 10000 names and delivery points be valid for up to three months. In some implementations, the user specifics may be used in relation to the identified parameters of method 420 of FIG. 4B. For example, if the user specifics requested are not part of the database, method 420 may provide for acquiring those specifics from items and providing anonymized information based on the user specifics accordingly.

At block 912, the method 900 identifies the requested recipient information based on any recipient requirements and the user specifics. For example, the method 900 may search a database or the memory 615 for the recipient name(s) and delivery point(s) as requested by the user request and corresponding information. In some embodiments, the identification of the requested recipient information may be performed by the processor 610 and/or the memory 615. In some embodiments, the associations between recipient name and delivery point may be stored in the memory 615 in an internal database or in an external database, such as the household database. The processor 610 and/or the memory 615 may generate a temporary list or database including the requested number of user names and corresponding delivery point information. Once the requested number of delivery points are identified, the method 900 proceeds to block 914.

At block 914, the method 900 select an encryption key or algorithm. In some embodiments, the selection may be based on the user specifics (e.g., duration). In some embodiments, the selection may be based on the user itself or may be randomized. For example, for a request of a large number of recipient names and delivery points, the method 900 may select a more complicated encryption key or algorithm to reduce the ability for the user to reverse engineer the encryption key. In some embodiments, the selection of the encryption key or algorithm may be performed by the encryption/decryption module 620. In some embodiments, the selection of the encryption key or algorithm may be performed by the processor 610. Once the encryption key or algorithm is selected, the method 900 proceeds to block 916.

At block 916, the method 900 encrypts the delivery point information for the temporary list or database generated during block 912. For example, the delivery point information corresponding to each name in the list or database may be individually encrypted to anonymize the information such that the user cannot determine the actual physical delivery point that corresponds with a given recipient name. In some embodiments, as described herein, the entire delivery point information for each recipient name is encrypted. In some embodiments, only the routing code and the delivery code may be encrypted. In some embodiments, only one of the routing code and the delivery code may be encrypted. Once the delivery point information is encrypted, the method 900 proceeds to block 918.

At block 918, the method 900 sends the encrypted delivery point information to the user. In some embodiments, sending the encrypted delivery point information to the user may comprise sending an 11-digit routing code for each recipient name in the temporary list or database. In some embodiments, sending the encrypted delivery point information may comprise sending a 31-digit string that the user can convert to an IMb™ for application to items with corresponding recipient names. In some embodiments, sending the encrypted delivery point information may also include sending the delivery code 802 to the user. As described here, in some embodiments, the delivery code 802 may be encrypted along with the encrypted routing code. In some embodiments, sending the encrypted delivery point information further comprises sending an indicator indicating that the recipient information is encrypted. In some embodiments, this indicator may be applied to the item so that the distribution system is able to easily identify that the item has an encrypted IMb™. In some embodiments, an indicator of which encryption key was used to encrypt the information may be included with the encrypted delivery point information that is sent to the user. In some embodiments, concurrent with the encrypted delivery point information being sent to the user, the method may also create an entry in the encryption/decryption module 620 or the memory 615 or in some storage location associating the user and/or the specific item with the encryption key used in the encrypted delivery point information. In some embodiments, the barcode ID portion of the IMb™ may indicate the encryption key used. For example, the barcode ID may comprise a value of 82, 83, or 84 to indicate an encrypted IMb™. In some embodiments, a particular logo or other printed information may be used to indicate an encrypted IMb™. Once the method 900 send the encrypted delivery point information to the user, the method ends at block 920. In some implementations, instead of sending the encrypted delivery point information to the user, the method 900 may apply the encrypted delivery point information to an item to be mailed directly without sending it to the requesting shipper first.

Figure 10:
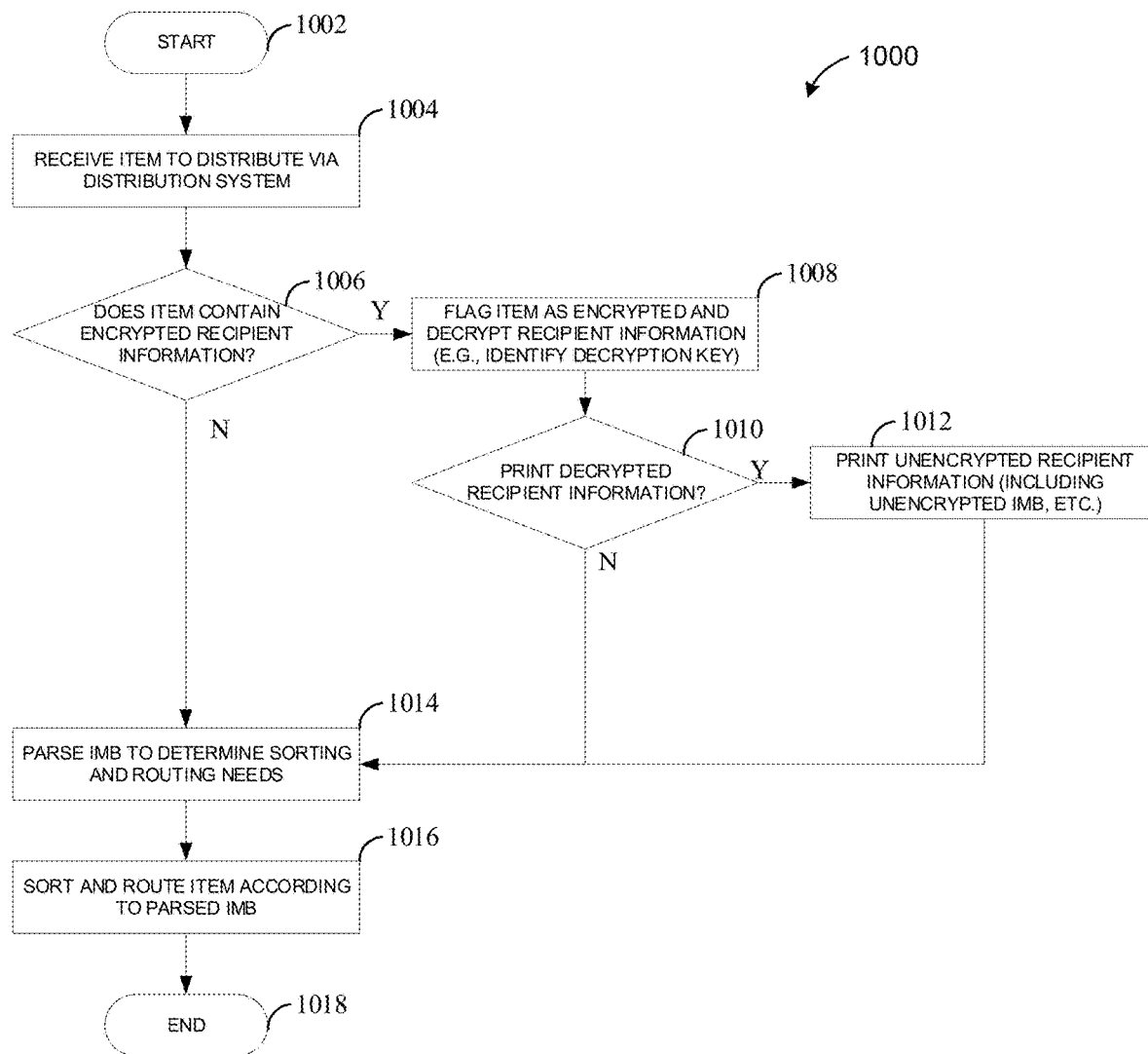
FIG. 10 is a flow chart of a method for receiving, sorting, and routing an item comprising encrypted delivery point information to a recipient.

FIG. 10 is a flow chart of a method 1000 of receiving, sorting, and routing an item comprising encrypted delivery point information to a recipient. In some embodiments, the method 1000 may be performed by the distribution system 100 comprising the delivery point information system 600. In some embodiments, the method 1000 may be performed by each piece of item processing equipment 635 and/or mobile computing device 640 in the anonymous information delivery point information system 600 that handles the item. Accordingly, the method 1000 may be performed locally by each item processing equipment using components similar to those described in relation to FIG. 6 or may be performed locally and remotely, where some or all of the processing may be performed in a central location. In some embodiments, the method 1000 starts at block 1002 and proceeds to block 1004.

At block 1004, the item processing equipment 635 or the mobile computing device 640 receives an item to enter into the distribution system 100 for delivery to a recipient. In some embodiments, the receiving of the item may occur at an intake facility and may be performed by a first item processing equipment of the distribution system 100 that scans the item. In some embodiments, the receiving of the item comprises scanning the IMb™ or other computer readable code, as described herein. The scanning may be performed by one or more components of the item processing equipment 635 or the mobile computing device 640 as used by a carrier. Once the item is received, the method 1000 proceeds to block 1006. In some implementations, the method 1000 may utilize aspects or components of the system 101 to perform the scanning functions.

At block 1006, the processor 610 and/or the encryption/decryption module 620 determines whether the item received in block 1004 comprises encrypted delivery point information. In some embodiments, this determination may be performed by the item processing equipment 635 and/or the mobile computing device 640. In some embodiments, this determination may comprise identifying an encryption indicator or similar indicator. In some embodiments, this may comprise identifying that the routing code of the IMb™, if not analyzed as having been encrypted, would be invalid. In some embodiments, the tracking code portion of the IMb™ may be used to determine whether the item comprises an encrypted routing code. For example, as the tracking code portion of the IMb™ can be a unique code specific to the item, information regarding the encrypted nature of the corresponding routing code of the IMb™ may be determinable (e.g., based on the association of the item with its encryption key in the storage location, as described herein). If the item is determined to comprise encrypted delivery point information, the method 1000 proceeds to block 1008. If the item is determined to not comprise encrypted delivery point information, the method 1000 proceeds to block 1014.

At block 1008, the processor 610, the memory 615, and/or the encryption/decryption module 620 flag the item as encrypted and decrypts the encrypted delivery point information. This flagging and decryption may occur in the item processing equipment 635 or the mobile computing device 640, and, as such, the communication module 625 may also be involved. In some embodiments, the item may be flagged so as to indicate to other item processing equipment 635 that the item is encrypted, which may reduce processing times by downstream equipment that no longer need to individually determine whether the item contains encrypted delivery point information. In some embodiments, where each piece of item processing equipment is configured to determine that items comprise encrypted delivery point information and is configured to decrypt the encrypted delivery point information, the item may not be flagged. In some embodiments, decrypting the encrypted delivery point information may comprise identifying the encryption key used to encrypt the delivery point information and decrypting the encrypted delivery point information using the same key.

In some embodiments, where all delivery point information is encoded using the same encryption key that is periodically rotated or changed, there may be only once active decryption key for the currently active encryption key. In some embodiments, a period of time may pass between the time when the delivery point information was encrypted and when the item enters the distribution system and the corresponding delivery point information is decrypted. However, during these times, the encryption key used (when a single key is used for all encryption) may have cycled to a subsequent encryption key. Accordingly, a current decryption key may not work to decrypt a previous encryption key. As such, in some embodiments, decrypting the encrypted delivery point information may comprise determining when the delivery point information was initially encrypted so as to help identify the appropriate decryption key.

In some embodiments, this same issue may arise in any situations where the encryption key cycles or rotates (e.g., regardless of a single encryption key being used system wide or being user specific, etc.). Accordingly, the identification of the decryption key may further comprise the determination of when the encrypted delivery point information was encrypted by looking at a date that may be included in the encrypted delivery point information, a postmark date, or a date that may be stored in the information in the storage location associated with the item and/or the user. In some embodiments, if the key appears to have changed since the delivery point information was encrypted (e.g., decrypting the encrypted delivery point information with what should be the correct decryption key is not working), then the item may be returned to the user with an error message or may be kicked out of automatic processing by the distribution system 100 and instead require manual intervention or processing.

In some embodiments, the decrypted delivery point information (e.g., the IMb™) is temporarily stored in memory while the item processing equipment in association with the particular item is being processed. Once the item is flagged as encrypted and/or the delivery point information is decrypted and/or the item is transferred to manual processing, the method 1000 proceeds to block 1010.

At block 1010, the method 1000 determines whether the decrypted delivery point information should be printed on the item. This determination may be made by the item processing equipment 635 or the mobile computing device 640. The determination may also be made by the processor 610 and/or the encryption/decryption module 620. In some embodiments, where the item may be handled by item processing equipment that is incapable of decrypting encrypted delivery point information, the non-encrypted delivery point information may be applied to the item. In some embodiments, if the non-encrypted delivery point information is applied to the item, the item may be marked, flagged, or otherwise indicated that the item cannot be returned to the user with due to the unencrypted delivery point information. If the method 1000 determines to print the unencrypted delivery point information on the item, the method 1000 proceeds to block 1012. If the method 1000 determines not to print the unencrypted delivery point information, then the method 1000 proceeds to block 1014.

At block 1012, the method 1000 prints and/or applies the unencrypted delivery point information on the item. This step may be performed by a printer or some other delivery point or IMb™ application device. This unencrypted delivery point information may comprise another IMb™ having an unencrypted routing code portion. In some embodiments, the unencrypted delivery point information may comprise the actual street delivery point of the recipient. Once the method 1000 completes the printing and/or application of the unencrypted delivery point information at block 1012, the method 1000 proceeds to block 1014.

At block 1014, the method 1000 parses the unencrypted or decrypted IMb™ (either printed on the item or stored in memory). Parsing the IMb™ may allow the method 1000 to identify the sorting and/or routing needs of the item. The parsing of the IMb™ may be performed by the processor 610 and/or the item processing equipment 635 or mobile computing device 640 itself. Once the IMb™ is parsed at block 1014, the method 1000 proceeds to block 1016, where the item is sorted and routed based on the parsed IMb™, after which the method 1000 ends at block 1018. In some embodiments, the method 1000 may be incorporated or integrated with method 400 and/or method 500 regarding receiving and delivering of items.

In some embodiments, the shipper described herein may be an individual that wishes to send an item to a known recipient but where the shipper is not aware of the recipient's most recent physical delivery point. Accordingly, in order to prevent the shipper from having to delay sending the item in order to contact the recipient and obtain the recipient's current physical delivery point, the shipper may use the recipient's name and a digital identifier of the recipient that the shipper knows, which may be different than a delivery point or physical address. The shipper can then request a delivery point or physical address from the distribution system, which the distribution can encrypt and associate with a computer readable code. The distribution sends the computer readable code to the shipper. Thus, the distribution system may identify and provide anonymized information for a single recipient based on the shipper-provided recipient's name and unique digital identifier. In some embodiments, the distribution system database may be used to store information regarding a type and/or quantity of items received by each recipient to whom the distribution system delivers items.

Figure 11:
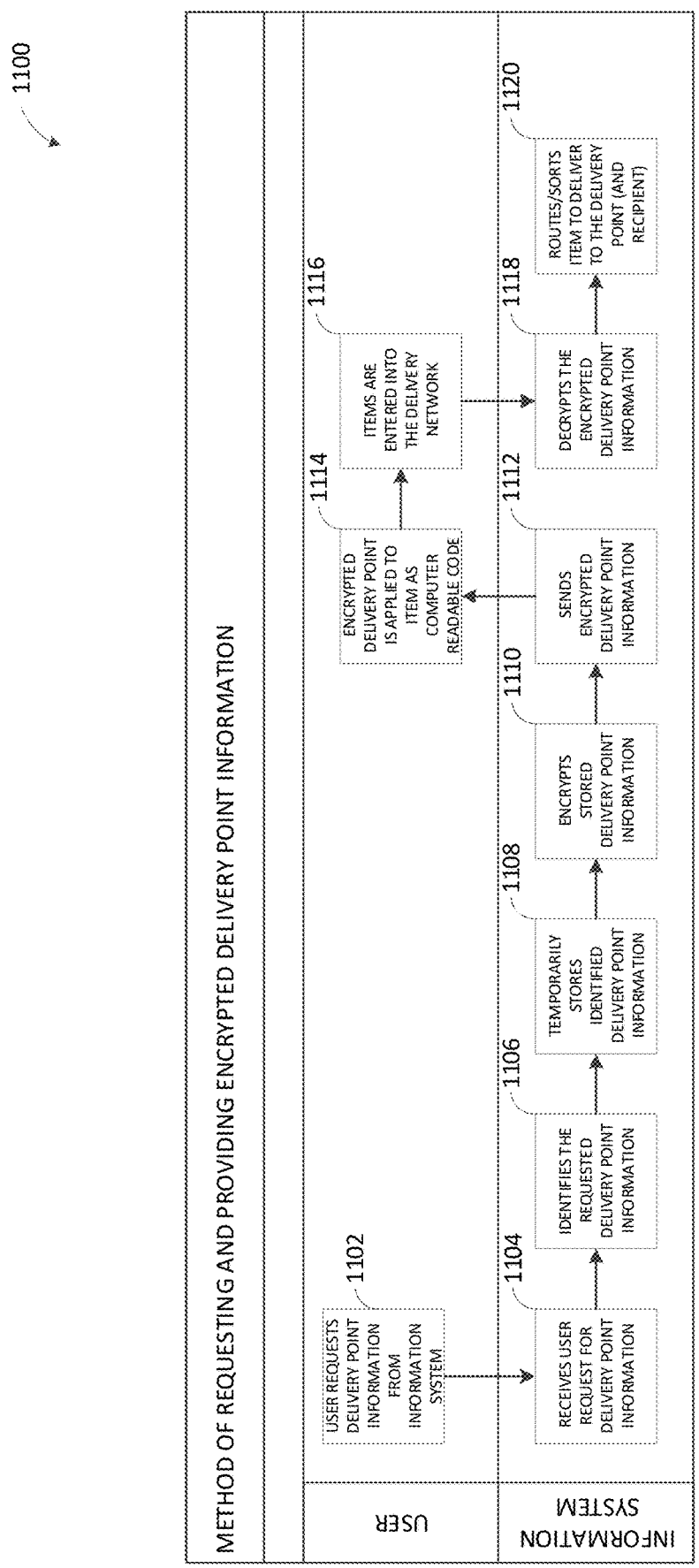
FIG. 11 is a process flow diagram of a method for requesting and providing encrypted delivery point information for an item and of processing and delivering the item to a recipient.

FIG. 11 is a cross-functional flow diagram of a method 1100 of requesting and providing encrypted delivery point information for an item and of processing and delivering the item to a recipient. The method 1100 may comprise actions performed by various equipment parties, including a user that requests the encrypted delivery point information and a distribution system 100 comprising a delivery point information system 1000 (as seen in FIGS. 1 and 2). In some embodiments, the method 1100 may be incorporated or integrated with method 400 and/or method 500 regarding receiving and delivering of items. The method 1100 starts at block 1102.

At block 1102, the user submits a request for encrypted delivery point information from the delivery point information system 600, which the delivery point information system 600 receives at block 1104. In some embodiments, the user request may be received via the commercial interface 630 and the communication module 625. In some embodiments, the user request may comprise a name for which the corresponding encrypted delivery point is requested. In some embodiments, the user request may comprise a quantity of names and encrypted delivery points which the user is requesting. Once the user request is sent/received at blocks 1102 and 1104, the method 1100 proceeds to block 1106.

At block 1106, the delivery point information system 600 identifies, in a database of the memory 615, the information requested in the user request. For example, when the user request comprises a name for which the corresponding encrypted delivery point is requested, the delivery point information system 600 determines if the database includes the name and the corresponding delivery point. If the database does include that information, then at block 1108, the processor 610 or the memory 615 extracts that information from the database and temporarily stores it. If the user request comprises a quantity of names and encrypted delivery points being requested, then the processor 610 or the memory 615 extracts from the database the requested number of names and corresponding delivery points for temporary storage. Once the delivery point information is identified and extracted, the method 1100 proceeds to block 1108.

At block 1108, the processor 610 or the memory 615 temporarily stores the delivery point information identified and extracted from the database before the method 1100 proceeds to block 1110. At block 1110, the encryption/decryption module 620 or the processor 610 may encrypt the stored delivery point information. In some embodiments, as described herein, a type or level of encryption may be selected based on one or more of the user, the quantity of names and delivery points requested, or a preset encryption level or type, at this block. Once the method 1100 encrypts the delivery point information, the method 1100 proceeds to block 1112.

At block 1112, the encrypted delivery point information is provided or sent to the user. In some embodiments, the communication module 625 or the commercial interface 635 performs the block 1110. In some embodiments, the encrypted delivery point information may be conveyed to a third-party shipper instead of or in addition to the user. In some embodiments, the encrypted delivery point information comprises encrypted routing codes corresponding to 31-digit strings that form IMbs™. In some embodiments, the encrypted delivery point information that is provided or sent also includes delivery codes as generated based on the delivery point information. In some embodiments, the delivery codes themselves may also be encrypted or only the delivery codes may be encrypted by the routing codes are not encrypted. In some embodiments, the encrypted delivery point information comprises the IMbs™ themselves along with the corresponding delivery codes for each name provided, where either one or both of a portion of the IMb™ and the delivery code is encrypted. In some embodiments, sending the encrypted delivery point information to the user may comprise sending the encrypted delivery point information to a third party. Once the encrypted delivery point information is provided or sent to the user, the method 1100 proceeds to block 1114.

At block 1114, the user (or third party shipper) prints or applies the encrypted delivery point information on an item to be sent to the recipient. In some embodiments, the user may print or apply the encrypted delivery point information (for example, in IMb™ format) to the item. In some embodiments, a third party may apply the encrypted delivery point information to the item. Once the encrypted delivery point information is applied to the item, the method 1100 proceeds to block 1116.

At block 1116, the user enters the item(s) into the distribution system 100. In some embodiments, this may comprise the user or third party depositing the item with an intake facility (e.g., via a carrier or drop-off at a delivery unit 104). This may also comprise the distribution system 100 receiving the item at the intake facility and scanning the item for computer readable code (e.g., the virtual or electronic identifiers or address (e-mail, phone, social media, etc.) or the IMb™). Once the item is entered into the distribution system 100, the method 1100 proceeds to block 1118.

At block 1118, the encryption/decryption module 620 or the processor 610 decrypts the encrypted delivery point information. In some embodiments, this may comprise parsing a decrypted IMb™ or other virtual or electronic identifier. Block 1118 of the method 1100 may also be performed by one or more of the memory 615, the item processing equipment 635 and/or the mobile computing device 640. Once the encrypted delivery point information is decrypted, the method 1100 proceeds to block 1120. At block 1120, the item processing equipment 735 and/or the mobile computing device 740 may be used to sort and route the item. The sorting and routing results in the item being delivered to the desired recipient without disclosing the recipient's physical, unencrypted delivery point to the user or to any party outside of the distribution system 100. Accordingly, the method 1100 ends at block 1118 once the item is delivered.

Figure 12:
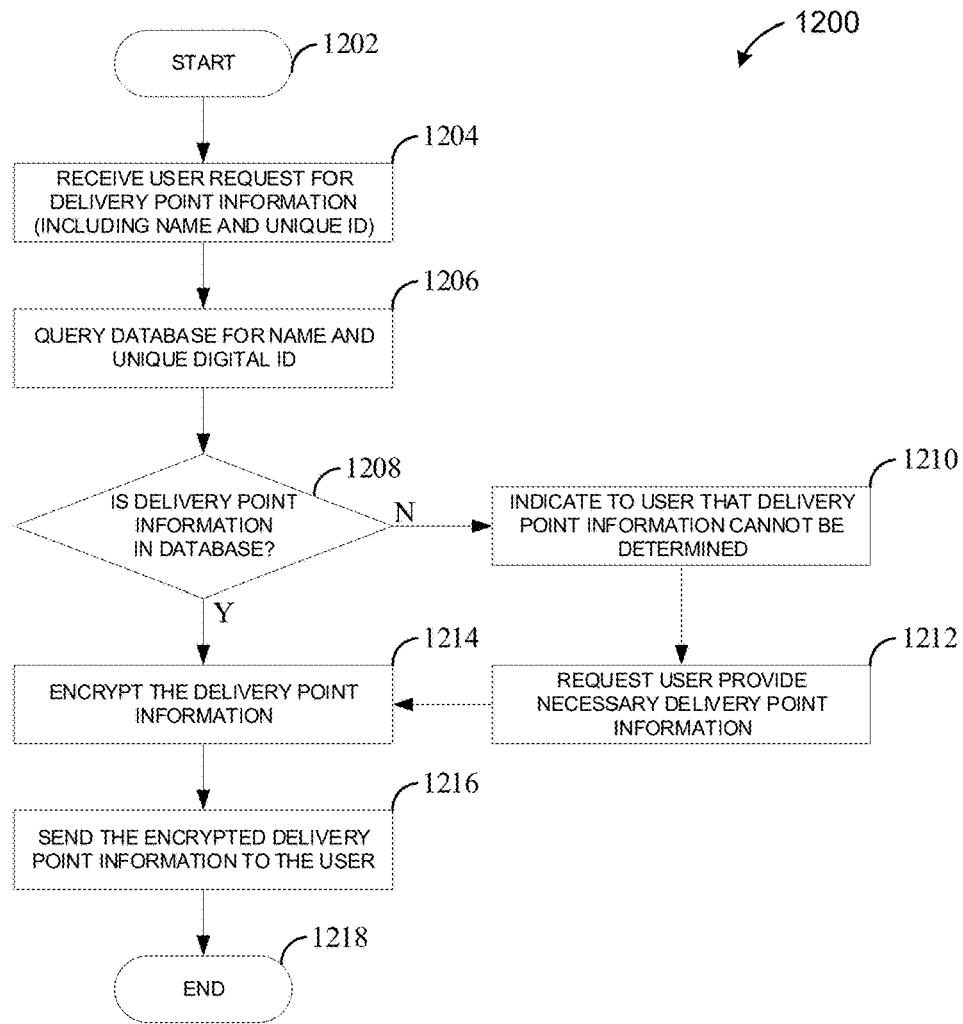
FIG. 12 is a flow chart of a method for receiving a user request for a delivery point associated with a particular recipient given the particular recipient's name and at least one unique digital identifier of the recipient and of providing anonymous delivery point information to a user based on the user request.

FIG. 12 is a flow chart of a method 1200 of receiving a user request for a particular recipient's delivery point given the particular recipient's name and at least one unique digital identifier of the recipient and of providing anonymous delivery point to a user based on the user request. The method 1200 may be performed by one or more components of the encrypted delivery point information delivery point information system 600. The method 1200 starts at block 1202 and proceeds to block 1204.

At block 1204, the commercial interface 630 and/or the communication module 625 may receive a user request for recipient information. In some embodiments, the receipt of the user request may comprise the user being authenticated via the authentication module 645. In some embodiments, the processor 610 may be involved with receiving the user request. In some embodiments, the user request may comprise a request for delivery point information corresponding to particular name of a recipient that is also included in the user request. The user request may also comprise a unique identifier corresponding to a unique digital identifier of the recipient. The unique digital identifier may be used as a check to ensure that the user requesting the recipient's delivery point actually knows the recipient. Once the user request including the recipient's name and unique digital identifier are received, the method 1200 proceeds to block 1206.

At block 1206, the processor 610 and the memory 615 may query a database for the recipient's name and unique digital identifier. In some embodiments, the database may comprise relational information associating recipient names with physical delivery points and unique digital identifiers, as described herein. Accordingly, querying the database for the recipient's name and corresponding unique digital identifier may comprise searching for associations between the recipient's name and the unique digital identifier and then identifying if there is an associated physical delivery point for that name and unique digital identifier. Once the database is queried, the method 1200 proceeds to block 1208.

At block 1208, the processor 610 and/or the memory 615 determines whether the recipient's information is in the database. Determining whether the recipient's information is in the database may comprise determining if it is true that the recipient's name and unique digital identifier correspond to the same individual. This may be performed by checking associations within the memory (e.g., the household database). If the recipient's name and the unique digital identifier correspond to the same individual (e.g., they are associated), then the processor 610 and/or the memory 615 determine if there is also address information associated with the recipient's name and unique digital identifier. Additionally, or alternatively, determining whether the recipient's information is in the database may comprise determining if it is true that a delivery point exists in the database that corresponds to the associated recipient's name and unique digital identifier. If the method 1200 determines that both of these determinations are true, then the method 1200 proceeds to block 1214. If the processor 610 and/or the memory 615 determine that either of these determinations is false, then the method 1200 proceeds to block 1210. In some embodiments, the method 1200 may be integrated with or amended with the methods 400-460 that may identify information that is not stored in the memory or database from items that processed by item processing equipment. Accordingly, user requests may be based on static or dynamic variables, such that the database may be supplemented based on a received request to enable future availability of information if not previously available.

At block 1210, one or more of the processor 610, the communication module 625, and the commercial interface 630 indicates to the user that the recipient's delivery point information cannot be determined based on the information in the user's request. In some embodiments, the indication may provide the user with another chance to provide the recipient's name and unique digital identifier for a second query of the database. Once the indication that the recipient's information cannot be determined is provided to the user, the method 1200 proceeds to block 1212, where the commercial interface 630 and/or the communication module 625 requests the user provide the necessary delivery point information if the user wishes to proceed with the encrypted delivery point information. Once the user provides the delivery point information, the method 1200 proceeds to block 1214. Though not shown here, if the user fails to provide the delivery point information, the method 1200 may proceed to block 1218 where the method terminates.

At block 1214, the processor 610 and/or the encryption/decryption module 620 may encrypt the delivery point information as identified in the database. In some embodiments, the encryption of the delivery point information may conform to any of the encryption discussion herein (e.g., user specific encryption, global encryption, periodic rotation of encryption protocols, etc.). In some embodiments, encrypting the delivery point information may comprise generating encrypted a routing code of an IMb™ digit string and providing a digital code. In some embodiments, both the routing code of the IMb™ digit string and the digital code may be encrypted or just the digital code may be encrypted. In some embodiments, encrypting the delivery point information may comprise generating another type of encrypting computer readable code. Once the encrypted delivery point information is generated, the method 1200 may proceed to block 1216.

At block 1216 of the method 1200, the encrypted delivery point information may be provided to the user. The block 1216 may be performed by one or more of the processor 610, the communication module 625, and the commercial interface 630. In some embodiments, providing the encrypted delivery point information to the user may comprise providing the user with the encrypted digit or character string corresponding to an associated computer readable code. In some embodiments, this may comprise the 31-digit string of the IMb™ along with a delivery code. In some embodiments, the provided encrypted delivery point information may comprise the barcode or computer readable code itself so that the user does not need to generate the computer readable code on their own. Once the encrypted delivery point information is provided to the user at block 1216, the method 1200 terminates at block 1218.

An apparatus for receiving wireless power may perform one or more of the functions of method 1200, in accordance with certain aspects described herein. The apparatus provide delivery point information. The apparatus may comprise a means for receiving a request for delivery point information from a user, wherein the request includes a recipient name and at least one unique digital identifier. In certain aspects, the means for receiving a request for delivery point information from a user, wherein the request includes a recipient name and at least one unique digital identifier can be implemented by the communication module 150, the communication module 625, the commercial interface 630, or the mobile computing device 640 (FIGS. 1 and 6). In certain aspects, the means for receiving a request for delivery point information from a user, wherein the request includes a recipient name and at least one unique digital identifier can be configured to perform the functions of block 1204 (FIG. 12). The apparatus may further comprise means for querying a database for the recipient name and the at least one unique digital identifier to determine whether the database includes the delivery point information for the recipient. In certain aspects, the means for querying a database for the recipient name and the at least one unique digital identifier to determine whether the database includes the delivery point information for the recipient can be implemented by the processor 110 or 610 or the memory 115 or 615. In certain aspects, the means for querying a database for the recipient name and the at least one unique digital identifier to determine whether the database includes the delivery point information for the recipient can be configured to perform the functions of block 1206 (FIG. 12). The apparatus may also comprise means for retrieving the delivery point information associated with the recipient name and the at least one unique digital identifier. In certain aspects, the means for retrieving the delivery point information associated with the recipient name and the at least one unique digital identifier can be implemented by the processor 110 or 610 or the memory 115 or 615. In certain aspects, the means for retrieving the delivery point information associated with the recipient name and the at least one unique digital identifier can be configured to perform the functions of block 1214 (FIG. 12). The apparatus may also comprise means for generating encrypted delivery point information based on the retrieved delivery point information and at least one encryption algorithm. In certain aspects, the means for generating encrypted delivery point information based on the retrieved delivery point information and at least one encryption algorithm can be implemented by the processor 110 or 610 or the encryption/decryption module 620. In certain aspects, the means for generating encrypted delivery point information based on the retrieved delivery point information and at least one encryption algorithm can be configured to perform the functions of block 1214 (FIG. 12). The apparatus may also comprise means for sending the encrypted delivery point information to the user. In certain aspects, the means for sending the encrypted delivery point information to the user can be implemented by the processor 110 or 610, the communication module 150, the communication module 625, the commercial interface 630, or the mobile computing device 640 (FIGS. 1 and 6). In certain aspects, the means for sending the encrypted delivery point information to the user can be configured to perform the functions of block 1216 (FIG. 12).

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as and ran under a conventional operating system. For example, any industry standard programming languages for which many commercial compilers can be used to create executable code may be used. The system control may also be written using interpreted languages.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. An apparatus for distributing an item, the apparatus comprising:
    a server configured to:
        generate a response to an electronic request for delivery point information for a plurality of entities within a geographic area, wherein the electronic request includes at least an identification of the geographic area, a subject matter in which the plurality of entities have shown interest, and a quantity of the plurality of entities for which delivery points are being requested, and wherein the response comprises the delivery point information for each of the plurality of entities, and
        cause the delivery point information for at least one of the plurality of entities to be physically applied to the item;
    an imaging system configured to:
        capture the delivery point information from the item;
    a processing circuit in communication with the imaging system, the processing circuit configured to:
        receive, from the imaging system, the delivery point information for the item to be distributed;
        determine whether the delivery point information comprises encrypted delivery point information based on identifying that the delivery point information of the item corresponds to an improper or nonexistent destination delivery point;
        flag the item as being encrypted based on the determination that the delivery point information corresponds to the improper or nonexistent destination delivery point;
        decrypt the encrypted delivery point information to generate decrypted delivery point information;
        generate a command to a printing device to print the decrypted delivery point information on the item;
        parse the decrypted delivery point information to determine sorting and routing instructions; and
        generate one or more commands to sort and route the item according to the determined sorting and routing instructions;
    the printing device configured to print the decrypted delivery point information on the item in response to receiving the command to print from the processing circuit; and
    a communications circuit configured to transmit the one or more commands to sort and route the item to a sorting apparatus and the command to print to the printing device.

2. The apparatus of claim 1, wherein the encrypted delivery point information comprises an encrypted intelligent mail barcode.

3. The apparatus of claim 1, wherein the encrypted delivery point information comprises one of an encrypted 11-digit Zip code™ and delivery code.

4. The apparatus of claim 1, wherein the decrypted delivery point information is generated based on a rotating decryption key.

5. The apparatus of claim 4, wherein the rotating decryption key is rotated at variable intervals.

6. The apparatus of claim 1, wherein the captured delivery point information represents at least one of an e-mail address, an IP address, a social media handle, and a virtual address of a recipient of the item.

7. The apparatus of claim 1, wherein determining whether the delivery point information comprises encrypted delivery point information further comprises identifying one or more of an encryption indicator.

8. The apparatus of claim 1, wherein generating the decrypted delivery point information comprises selecting a decryption key from a plurality of decryption keys based on an indication of an implemented encryption key in the encrypted delivery point information.

\* \* \* \* \*